United States Patent
Asao et al.

(10) Patent No.: US 6,946,759 B2
(45) Date of Patent: Sep. 20, 2005

(54) STATOR FOR AN AUTOMOTIVE ALTERNATOR AND METHOD OF MANUFACTURING THE SAME

(75) Inventors: Yoshihito Asao, Tokyo (JP); Katsumi Adachi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 394 days.

(21) Appl. No.: 09/728,092

(22) Filed: Dec. 4, 2000

(65) Prior Publication Data

US 2002/0011753 A1 Jan. 31, 2002

(30) Foreign Application Priority Data

Mar. 16, 2000 (JP) .......................................... 2000-74576

(51) Int. Cl.⁷ ............................................. H02K 15/12
(52) U.S. Cl. ....................................................... 310/45
(58) Field of Search .......................... 310/43, 201, 45, 310/208, 254, 179, 180

(56) References Cited

U.S. PATENT DOCUMENTS

| | | | | |
|---|---|---|---|---|
| 4,588,916 A | * | 5/1986 | Lis .............................. | 310/260 |
| 5,097,167 A | * | 3/1992 | Kanayama et al. ......... | 310/201 |
| 5,789,840 A | * | 8/1998 | Gould et al. ................ | 310/179 |
| 5,998,903 A | * | 12/1999 | Umeda et al. .............. | 310/179 |
| 6,121,701 A | * | 9/2000 | Kloeppel et al. ............ | 310/71 |
| 6,333,573 B1 | * | 12/2001 | Nakamura ................... | 310/45 |

FOREIGN PATENT DOCUMENTS

| | | |
|---|---|---|
| DE | 195 29 392 A1 | 2/1997 |
| EP | 917278 A2 | 5/1999 |
| EP | 923187 A2 | 6/1999 |
| EP | 978927 A1 | 2/2000 |
| JP | 11-75334 | 3/1999 ............ H02K/3/34 |

* cited by examiner

Primary Examiner—Thomas M. Dougherty
Assistant Examiner—Karen Addison
(74) Attorney, Agent, or Firm—Sughrue Mion, PLLC

(57) ABSTRACT

In a stator for an alternator includes electric conductors which include a plurality of winding sub-portions in each of which one long strand of wire is bent back outside the slots at end surfaces of the stator core and wound into a wave winding so as to alternately occupy an inner layer and an outer layer in a slot depth direction within the slots a predetermined number of slots apart, and the turned portions of the strands of wire bent back outside the slots at both the end surfaces of the stator core are disposed in a circumferential direction so as to constitute a joint-side coil end and a turn-side coil end and the plurality of windings sub-portions are connected to each other on the joint-side coil end at a first end of the stator core, the average amount of application per unit area of any one of the varnish, with which the joint-side coil end is impregnated and the varnish, with which the counter-joint-side coil end is impregnated, is larger than the average amount of application per unit area of the other of the varnishes. With this construction, there can be obtained a stator for an automotive alternator in which the insulation of a joint-side coil end having no insulation film can be improved and the amount of varnish for impregnation is not unncessarily increased.

19 Claims, 15 Drawing Sheets

STATOR FOR AN AUTOMOTIVE ALTERNATOR AND METHOD OF MANUFACTURING THE SAME

BACKGROUND OF THE INVENTION

1. Field of the Invention

The present invention relates to an automotive alternator, and more particularly, to improvement of a stator.

2. Description of the Related Art

FIG. 15 is a sectional view showing a conventional automotive alternator. The alternator includes a case 3 composed of an aluminum front bracket 1 and an aluminum rear bracket 2, a rotating shaft 6, a rotating shaft 6 accommodated in the case 3 and having a pulley 4 fixed to an end thereof, a Lundell-type rotor 7 fixed to the rotating shaft 6, cooling fans 5 fixed at both the sides of the rotor 7, a stator 8 fixed at the inner wall surface in the case 3, slip rings 9 fixed at the other end of the rotating shaft 6 for supplying current to the rotor 7, a pair of brushes 10 in sliding contact with the slip rings 9, a brush holder 11 in which the brushes 10 are housed, rectifiers 12 electrically connected to the stator 8 for converting alternate current generated in the stator 8 to direct current, a heat sink 17 fitted at the brush holder, and a regulator 18 adhered to the heat sink 17 for regulating the magnitude of AC voltage generated by the stator 8.

The rotor 7 includes a rotor coil 13 for generating magnetic flux on passage of electric current and a pole core 14 disposed so as to cover the rotor coil 13, magnetic poles being formed by magnetic flux generated in the rotor coil 13. The pole core 14 is composed of a pair of a first pole core member 21 and a second pole core member 22 which are meshed with each other. The first pole core member 21 and the second pole core member 22 are made of iron, each has claw-shaped magnetic poles 23 and 24.

The stator 8 includes a stator core 15, and a stator coil 16 in which alternate current is generated by the change of magnetic flux from the rotor coil 13 as the rotor 7, which has a conductive wire wound around the stator core 15, rotates.

In the automotive alternator constructed as described above, electric current is supplied from a battery (not shown) through the brushes 10 and the slip rings 9 to the rotor coil 13, generating magnetic flux. The claw-shaped magnetic poles 23 of the first pole core member 21 are magnetized with north seeking (N) poles by this magnetic flux, and the claw-shaped magnetic poles 24 of the second pole core member 22 are magnetized with south-seeking (S) poles. At the same time, the pulley 4 is driven by an engine and the rotor 7 is rotated by the rotating shaft 6. Thus, a rotating magnetic field is applied to the stator coil 16, generating electromotive force in the stator coil 16. This alternating electromotive force passes through the rectifiers 12 and is rectified to direct current, the output voltage of the rectifiers 12 is regulated by the regulator 18, and the battery is recharged.

The cooling air flow generated by the cooling fans 5 is sucked in from the air intake vents 1a and 2a of the front and rear brackets 1 and 2, cools the rectifiers 12 and the regulator 18 as heating members passing therethrough at a rear end and further cools the front-end and rear-end coil ends 16a and 16b of the stator coil passing through the blades 51 of the respective fans from the inner diameter side to the outside diameter side thereof, and is discharged from the air discharge vents 1b and 2b of the front and rear brackets 1 and 2. That is, the coil ends 16a and 16b of the stator coil 16, which generate a large amount of heat and influence an output capability when heated to high temperature, are interposed between the blades 51 and the air discharge vents 1b and 2b of the front and rear brackets 1 and 2 so as to be reliably cooled.

In the stator 8, the rear side of an approximately-U-shaped segment 31 is molded in a tortoise shell shape (bent at three positions) and inserted into the stator core 15 as shown in FIG. 16. Thus, the coil ends 16a and 16b are bent back at the extreme end of the U-shaped bent portion inclined with respect to the rotating shaft 6 linearly from the root thereof projecting from the stator core 15 to the extreme end thereof so that adjacent segments 31 are neatly arranged without overlapping with each other. With the above construction, the stator 8 has the same shape over substantially the overall circumference thereof and is constructed very neatly.

In the stator constructed as described above, both the sides of the U-shaped portion of an approximately U-shaped segment 31 are inserted into one of the slots 15a of the stator core 15 from the lower side of the figure as shown in FIG. 16, and the ends of the U-shaped segment 31, which project upward from the stator core 15 in the figure, are bent and then jointed to the ends of other U-shaped segment 31, thereby forming a stator winding. In conventional automotive alternators, the average amount of application per unit area of the varnish, with which the joint-side coil end 16a of an U-shaped segment 31 is impregnated, is the same as the average amount of application per unit area of the varnish, with which the curved turn-side (counter-joint-side) coil end 16b of the U-shaped segment 31.

Further, in other example of the stator of conventional automotive alternators, both the coil ends 16a and 16b are impregnated with no varnish.

When the stator of the automotive alternator constructed as described above is impregnated with no varnish, insulation is lost between respective coil pieces on a joint-side thereof having no insulation film, by which an output is dropped by short-circuit and magnetic noise is deteriorated.

Further, when the coil ends 16a and 16b are not impregnated with varnish, the inner circumferential surfaces of the coil ends are made uneven by the windings arranged in a circumferential direction. Thus, there is arisen a problem that interference noise is generated by the rotation of the claw-shaped magnetic poles of the rotor 7 and the rotation of the fan 5.

In contrast, when both the coil ends 16a and 16b are impregnated with varnish in the same amount, the turn-side coil end 16b, whose insulation is not substantially lost, is impregnated with varnish similarly, which increases an amount of impregnation of varnish and a cost is increased accordingly. Further, the cooling property of the stator 8 is lowered by an increase in an amount of impregnation of varnish.

Furthermore, in the bent and jointed coil end, a load due to residual stress, which is generated when the segments are bent and deformed, is applied to the coil end. However, when a small amount of varnish is applied to the coil end, it is vibrated because it has a small amount of mechanical fastening force and a small amount of rigidity, noise being caused by the vibration of it and the insulation film of the coil end being exfoliated thereby.

SUMMARY OF THE INVENTION

Accordingly, it is an object of the present invention, which was made to solve the above problems, is to provide a stator for an automotive alternator which can improve the insulation of a joint-side coil end having no insulation film, does not need varnish in an amount more than necessary, can improve the cooling property of a stator, reduce wind noise and further improve the mechanical rigidity of the stator.

According to an aspect of the invention, in a stator for an automotive alternator including a rotor, which has claw-shaped magnetic poles fitted on a rotating shaft and fans, and the stator, which is disposed around the outer circumference of the rotor, has a coil wound therearound and connected into three-phase alternating-current connections, and is ventilated and cooled by the fans, wherein the stator includes a stator core in which a plurality of slots are formed and a stator winding wound around the stator core, the stator winding being composed of a plurality of electric conductors jointed to each other, the electric conductors include a plurality of winding sub-portions in each of which one long strand of wire is bent back outside the slots at end surfaces of the stator core and wound into a wave winding so as to alternately occupy an inner layer and an outer layer in a slot depth direction within the slots a predetermined number of slots apart, and the turned portions of the strands of wire bent back outside the slots at both the end surfaces of the stator core are disposed in a circumferential direction so as to constitute a joint-side coil end and a turn-side coil end, and the plurality of windings sub-portions are connected to each other on the joint-side coil end at a first end of the stator core, the stator for the automotive alternator is characterized in that the average amount of application per unit area of any one of varnish, with which the joint-side coil end is impregnated and varnish, with which the counter-joint-side coil end is impregnated, is larger than the average amount of application per unit area of the other of the varnishes.

According to another aspect of the invention, in a stator for an automotive alternator including a rotor, which has claw-shaped magnetic poles fitted on a rotating shaft and fans, and the stator, which is disposed around the outer circumference of the rotor, has a coil wound therearound and connected into three-phase alternating-current connections, and is ventilated and cooled by the fans, wherein the stator includes a stator core in which a plurality of slots are formed and a stator winding wound around the stator core, the stator winding being composed of a plurality of electric conductors jointed to each other, the electric conductors are formed by being bent in a circumferential direction and jointed to each other so that conductor segments are connected to other conductor segments, which are located at different slots, at the open ends thereof, and the plurality of conductor segments are connected to each other on a joint-side coil end at a first end of the stator core, the stator for the automotive alternator is characterized in that the average amount of application per unit area of any one of the varnish, with which the joint-side coil end is impregnated and the varnish, with which the counter-joiny-side coil end is impregnated, is larger than the average amount of application per unit area of the other of the varnishes.

The average amount of application per unit area of the varnish, with which the joint-side coil end is impregnated, may be larger than the average amount of application per unit area of the varnish, with which the counter-joint-side coil end is impregnated.

The average amount of application per unit area of the varnish, with which the counter-joint-side coil end is impregnated, may be larger than the average amount of application per unit area of the varnish, with which the joint-side coil end is impregnated.

The amount of the varnish, with which the joint-side coil end is impregnated in the slots, may be larger than the amount of the varnish, with which the counter-joint-side coil end is impregnated in the slots.

The amount of the varnish, with which the counter-joint-side coil end is impregnated in the slots, may be larger than the amount of the varnish, with which the joint-side coil end is impregnated in the slots.

The counter-joint-side coil end may be impregnated with no varnish.

The varnish, with which the joint-side coil end is impregnated, may fill the spaces between the electric conductors inclined in the circumferential direction of the stator without leaving substantially any gaps having no varnish.

The gap between the coils, which are inclined in the circumferential direction of the stator, of the joint-side coil end may be smaller than the gap of the respective coils, which are inclined in the circumferential direction of the stator, of the counter-joint-side coil end.

The axial height of the coils, which are inclined in the circumferential direction of the stator, of the joint-side coil end may be smaller than the axial height of the coils, which are inclined in the circumferential direction of the stator, of the counter-joint-side coil end.

A gap in a radial direction may be defined between the electric conductors at an innermost layer in a radial direction in the slots and a slot opening, and the gap is impregnated with varnish.

A cooling fan may be mounted on at least one of the ends in an axial direction of the rotor to ventilate and cool the coil ends of the stator from the inside diameter side thereof.

Rectifiers may be disposed at the joint-side coil end.

The rectifiers may be disposed at the counter-joint-side coil end.

According to a still another aspect of the invention, a method of manufacturing a stator for an automotive alternator according to the initially mentioned aspect of the invention, includes the step of supplying varnish dropwise from the outside diameter direction of the stator core and impregnating only any one of the coil ends with the varnish.

According to a further aspect of the invention, a method of manufacturing a stator for an automotive alternator according to the initially mentioned aspect of the invention, includes the step of supplying varnish dropwise from the axial direction of the stator core and impregnating only any one of the coil ends with the varnish.

According to a still further aspect of the invention, a method of manufacturing a stator for an automotive alternator according to the initially mentioned aspect of the invention, includes the steps of supplying dropwise varnish to only any one of the coil ends from the outside diameter direction or the axial direction of the stator core, and gelling and drying the varnish while keeping the coil end, to which the varnish is supplied dropwise, at a position higher than the position of the other coil end.

DESCRIPTION OF THE PREFERRED EMBODIMENTS

The embodiments of the present invention will be described below with reference to the drawings.

Embodiment 1

Figure 1:
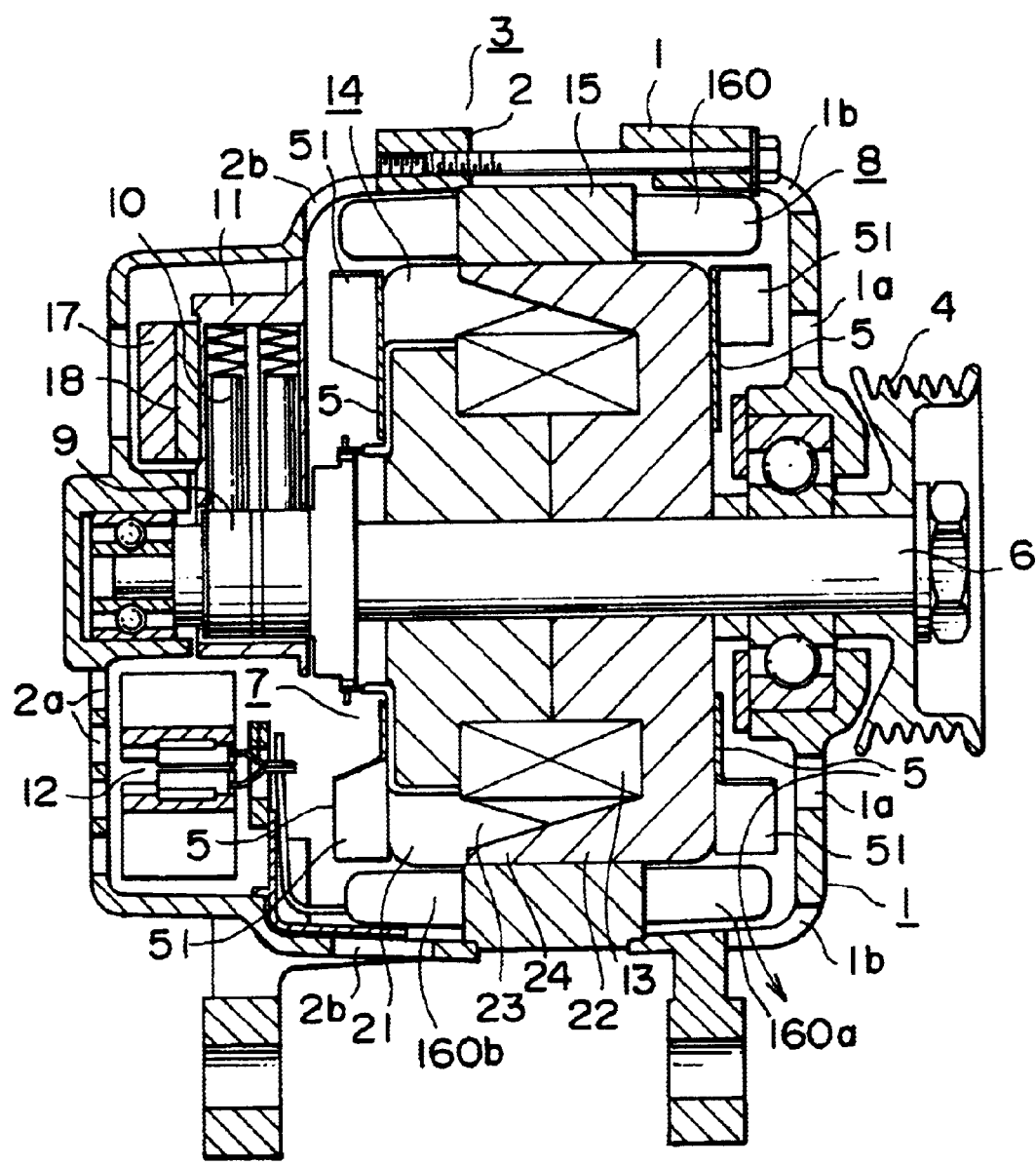
FIG. 1 is a sectional view showing an automotive alternator in an embodiment 1 of the present invention.

FIG. 1 is a sectional view showing a three-phase automotive alternator according to an embodiment 1 of the present invention the stator of which has sixteen poles and ninety-six (96) slots. In FIG. 1, the alternator of the embodiment includes a case 3 composed of an aluminum front bracket 1 and an aluminum rear bracket 2, a rotating shaft 6, a rotating shaft 6 accommodated in the case 3 and having a pulley 4 fixed to an end thereof, a Lundell-type rotor 7 fixed to the rotating shaft 6, cooling fans 5 fixed at both the sides of the rotor 7, a stator 8 fixed at the inner wall surface in the case 3, slip rings 9 fixed at the other end of the rotating shaft 6 for supplying current to the rotor 7, a pair of brushes 10 in sliding contact with the slip rings 9, a brush holder 11 in which the brushes 10 are housed, rectifiers 12 electrically connected to the stator 8 for converting alternate current generated in the stator 8 to direct current, a heat sink 17 fitted at the brush holder, and a regulator 18 adhered to the heat sink 17 for regulating the magnitude of AC voltage generated by the stator 8.

The rotor 7 includes a rotor coil 13 for generating magnetic flux on passage of electric current and a pole core 14 disposed so as to cover the rotor coil 13, magnetic poles being formed by magnetic flux generated in the rotor coil 13. The pole core 14 is composed of a pair of a first pole core member 21 and a second pole core member 22 which are meshed with each other. The first pole core member 21 and the second pole core member 22 are made of iron, each has claw-shaped magnetic poles 23 and 24.

The stator 8 includes a stator core 15, and a stator coil 160 from which alternate current is generated by the change of magnetic flux from the rotor coil 13 as the rotor 7, which has a conductive wire wound around the stator core 15, rotates.

In the automotive alternator constructed as described above, electric current is supplied from a battery (not shown) through the brushes 10 and the slip rings 9 to the rotor coil 13, generating magnetic flux. The claw-shaped magnetic poles 23 of the first pole core member 21 are magnetized with north-seeking (N) poles by this magnetic flux, and the claw-shaped magnetic poles 24 of the second pole core member 22 are magnetized with south-seeking (S) poles. At the same time, the pulley 4 is driven by an engine and the rotor 7 is rotated by the rotating shaft 6. Thus, a rotating magnetic field is applied to the stator coil 160, generating electromotive force in the stator coil 160. This alternating electromotive force passes through the rectifiers 12 and is rectified to direct current, the output voltage of the rectifiers 12 is regulated by the regulator 18, and the battery is recharged.

The cooling air flow generated by the cooling fans 5 is sucked in from the air intake vents 1a and 2a of the front and rear brackets 1 and 2, cools the rectifiers 12 and the regulator 18 as heating members passing therethrough at a rear end and further cools the front-end and rear-end coil ends 160a and 160b of the stator coil passing through the blades 51 of the respective fans from the inner diameter side to the outside diameter side thereof, and is discharged from the air discharge vents 1b and 2b of the front and rear brackets 1 and 2. That is, the coil ends 160a and 160b of the stator coil 160, which generate a large amount of heat and influence an output capability when heated to high temperature, are interposed between the blades 51 and the air discharge vents 1b and 2b of the front and rear brackets 1 and 2 so as to be reliably cooled.

In the stator 8, the rear end of an approximately-U-shaped segment 31 is molded in a tortoise shell shape (having three bent portions) and inserted into the stator core 15 similarly to the conventional example. Thus, the coil ends 160 and 160b are bent back at the extreme end of the U-shaped bent portion inclined with respect to the rotating shaft 6 linearly from the root thereof projecting from the stator core 15 to the extreme end thereof so that adjacent coils are neatly arranged without overlapping with each other at the extreme ends and the like. With the above construction, the stator 8 has the same shape over substantially the overall circumference thereof and is constructed very neatly.

Figure 2:
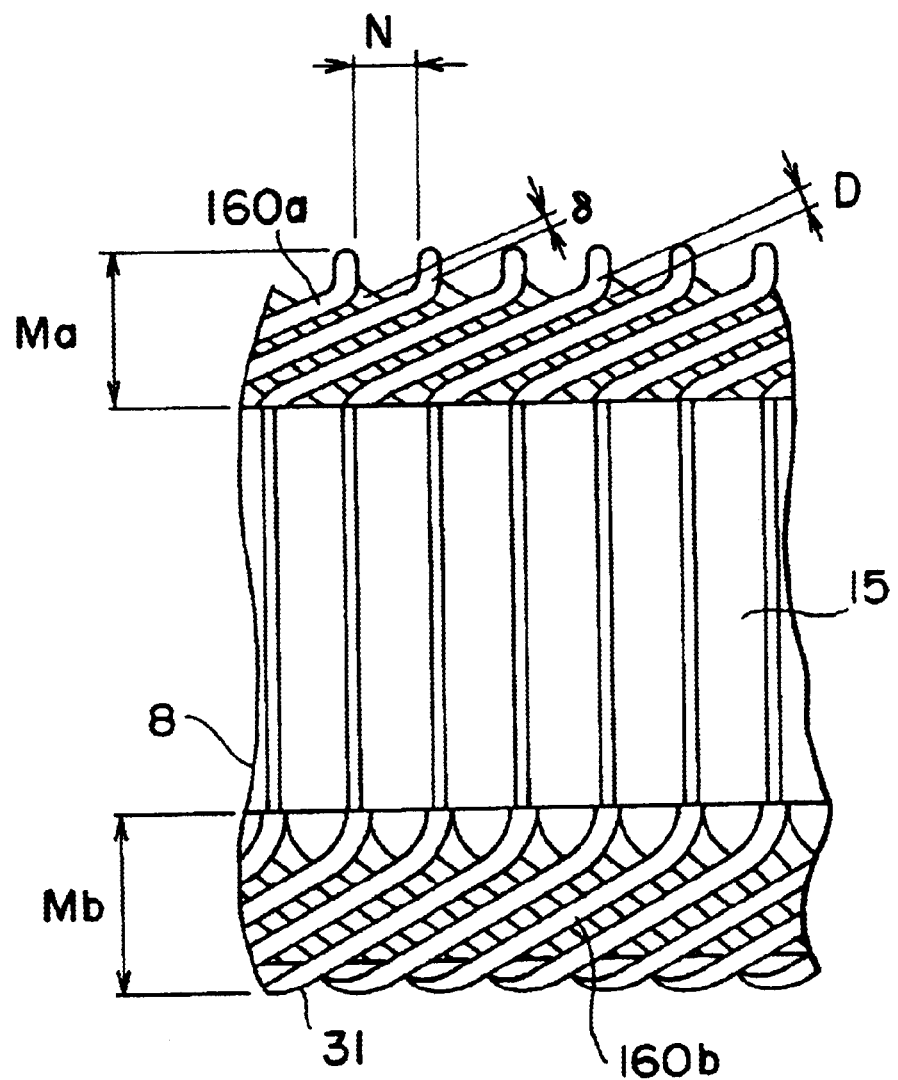
FIG. 2 is a view explaining the construction of a stator for the automotive alternator.

FIG. 2 is a view explaining the construction of the stator for the automotive alternator. In FIG. 2, both the sides of the U-shaped portions of an approximately U-shaped segment 31 are inserted into one of the slots 15a of the stator core 15 from the lower side of FIG. 2, and the ends of the U-shaped segment 31, which project upward from the stator core 15 in FIG. 2, are jointed to the ends of other U-shaped segment 31, thereby forming a stator winding similarly to the conventional example.

Figure 3:
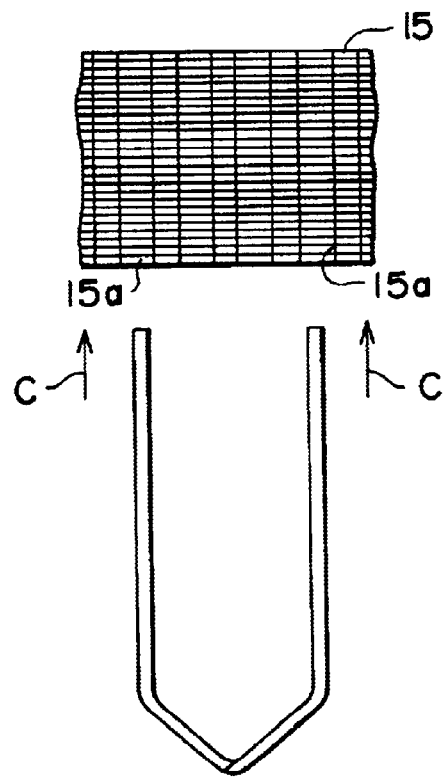
FIG. 3 is a view showing how a U-shaped segment is formed by being bent.
Figure 4:
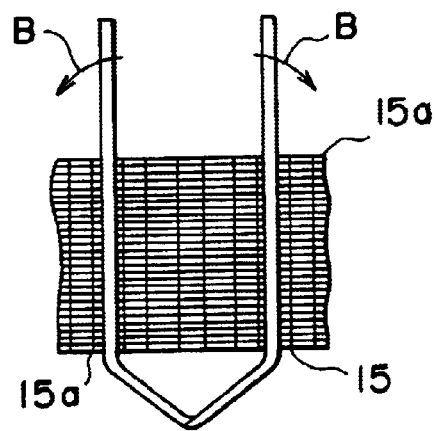
FIG. 4 is a view showing how the U-shaped segment is formed by being bent.
Figure 5:
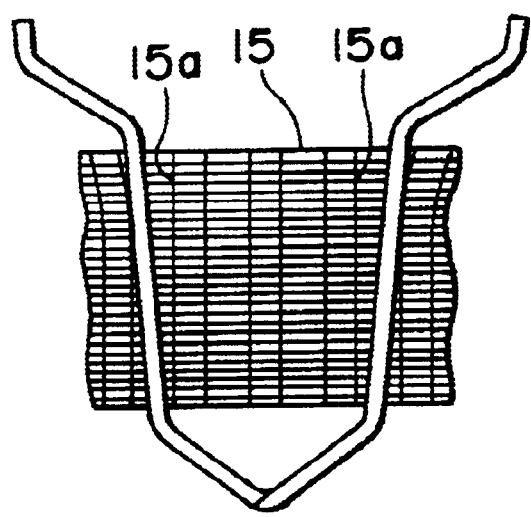
FIG. 5 is a view showing how the U-shaped segment is formed by being bent.

FIGS. 3 to 5 are views showing how the U-shaped segment 31 is formed by being bent. The approximately U-shaped segment 31 is first inserted into the slot 15a of the stator core 15 from the side end surface of the core 15 facing downward in FIG. 3 in the direction of arrows C. Thereafter, the straight portions of the segment 31 are bent at a predetermined angel in a radial direction and at a predetermined angle in a circumferential direction.

Figure 6:
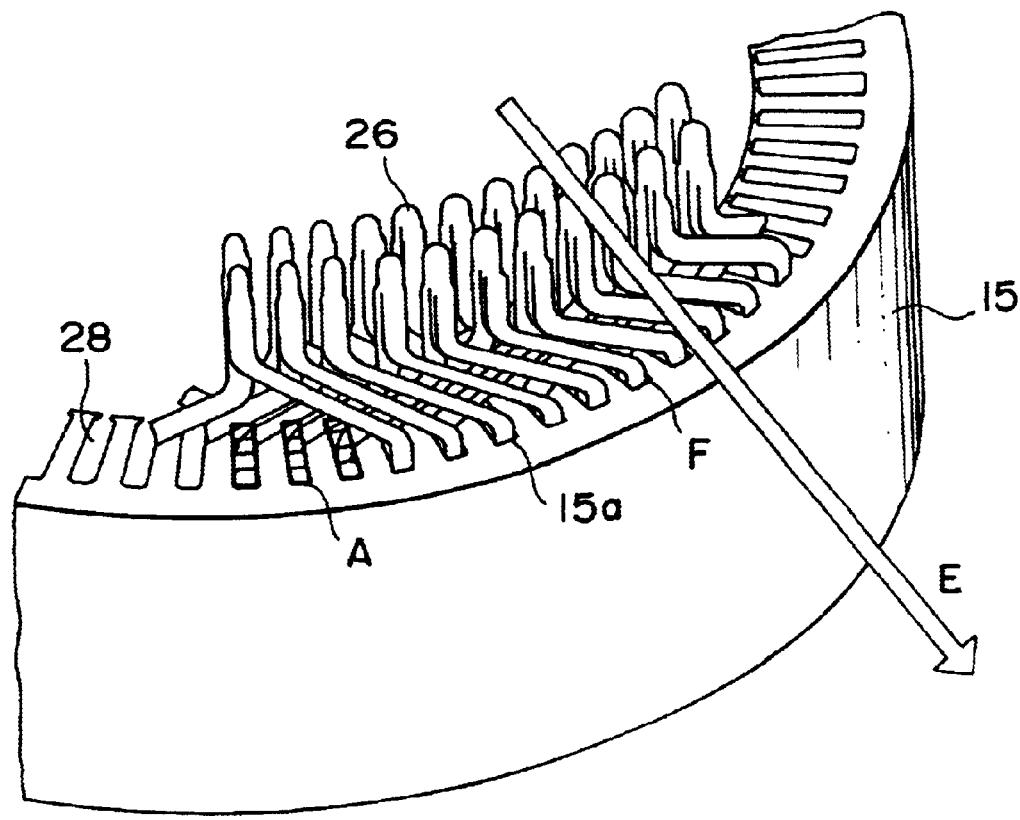
FIG. 6 is a view showing how a winding is constructed by inserting the U-shaped segment into a stator core.
Figure 6:
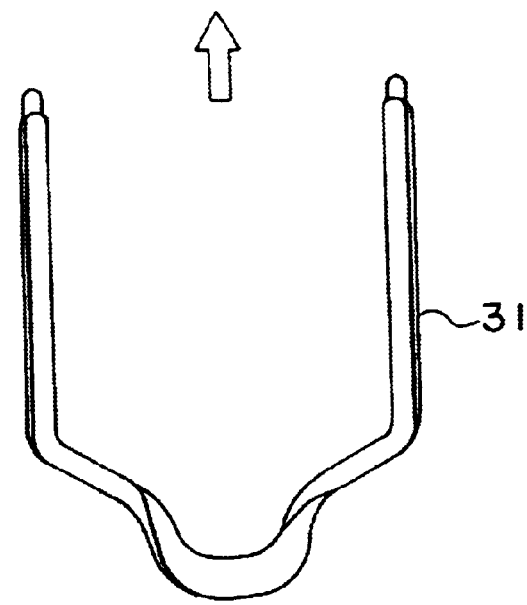

FIG. 6 is a view showing how a winding is constructed by inserting the approximately U-shaped segment 31 into the stator core 15 similarly. Both the sides of the U-shaped portion of the approximately U-shaped segment 31 are inserted into the slot 15a of the stator core 15 from the lower side of the figure, and the ends of the U-shaped segment 31, which project upward from the stator core 15 in the figure, are bent and then jointed to the ends of other U-shaped segment 31 at a joint portion 26, thereby forming the stator winding.

In FIG. 2, reference numeral 160*a* denotes a joint-side coil end where the ends of the U-shaped segments 31 are jointed to each other, whereas reference numeral 160*b* denotes a turn-side coil end where the curved portions of the U-shaped segments 31 are arranged. The respective coil ends 160*a* and 160*b* are constructed such that when they are projected onto a surface parallel with the rotating shaft 6 of the rotor 7, they are overlapped with the respective blades 51 of the cooling fans 5 in an axial direction, respectively.

Varnish is applied to both the coil ends 160*a* and 160*b* for the purpose of improving the insulation of the joint-side thereof where an insulation film is removed by welding and for the purpose of increasing the mechanical fastening force of the stator winding. The varnish is applied to cover the overall surface of the winding, in particular, a large amount of varnish stays at the portion where adjacent segments 31 are in contact with each other so that the adjacent segments 31 are fixed to each other to thereby improve the mechanical strength of the overall winding. Further, the application of varnish can prevent the drop of an output which would be otherwise caused by the short-circuit of the joint-side having no insulation film and prevent the deterioration of magnetic noise. Furthermore, while a load due to residual stress is applied to the segments 31 having been bent and jointed to each other when they are deformed by being bent, the reduction of the mechanical fastening force thereof caused by the residual stress can be prevented by the application of varnish.

The average amount of application per unit area of the varnish, with which the joint-side coil end 160*a* of the embodiment is impregnated, is larger than the average amount of application per unit area of the varnish, with which the turn-side (counter-joint-side) coil end 160*b* is impregnated. With this construction, the total amount of deposition of varnish can be reduced without reducing the amount of the varnish applied to minimum necessary sections, which minimizes the reduction of the cooling property of the coil ends caused by the deposition of the varnish as well as reduces a varnish cost.

Further, the gap between the end of the stator core 15 and the segments 31 in the slot 15*a* is larger on the coil end 160*a* side, where the segments 31 are bent and jointed to each other, than on the coil end 160*b* side. As a result, the amount of the varnish, with which the joint-side coil end 160*a* is impregnated, is larger than the amount of the varnish with which the turn-side coil end 160*b* is impregnated. With this construction, the mechanical fastening force of the joint-side coil end 160*a* is increased.

Further, in the respective joint-side coil ends 160*a*, an insulating distance (gap between the segments in the portion molded by bending) δ which is the gap between the U-shaped segments 31 adjacent in a circumferential direction is set to 80% of the thickness of each segment 31 in the circumferential direction.

Then, the gap δ between the respective segments 31 which are inclined in the circumferential direction of the stator at the joint-side coil end 160*a* is smaller than the gap δ between the respective segments 31 which are inclined in the circumferential direction of the stator at the turn-side coil end 160*b*. The improved insulation of the joint-side coil end 160*a*, which is achieved by impregnating the joint-side coil end 160*a* with a larger amount of varnish, permits the gap between the respective segments 31, which are inclined in the axial direction of the stator 8, of the joint-side coil end 160*a* to be made smaller than the gap between the respective segment 31, which are inclined in the axial direction of the stator 8, of the turn-side coil end 160*b*. As a result, the gap between the segments 31 can be easily filled with varnish, the varnish can be easily held therebetween, and the insulation of the segments 31 can be more improved. Further, the narrow gap between the segments 31 makes the inner layer surface of the coil ends flat, which can reduce the interference noise caused by the rotation of the claw-shaped magnetic poles of the rotor 7 and the rotation of the fans.

Further, the axial height Ma of the segments 31, which are inclined in the circumferential direction of the stator, of the joint-side coil end 160*a* is smaller than the axial height Mb of the segments 31, which are inclined in the circumferential direction of the stator, of the turn-side coil end 160*b*. The gap between the respective segments 31, which are inclined in the circumferential direction of the stator, of the joint-side coil end 160*a* can be made smaller that the gap between the respective segments 31, which are inclined in the axial direction of the stator, of the turn-side coil end 160*b*. Accordingly, the segments 31 of the joint-side coil end 160*a* can be bent at large angle and, as a result, the axial height Ma of the segments 31 of the joint-side coil end 160*a* can be reduced, by which the size of the alternator can be reduced. Further, the narrow gap between the segments 31 makes the inner circumferential surface of the coil ends flat, which can reduce the interference noise caused by the rotation of the claw-shaped magnetic poles of the rotor 7 and the rotation of the fans.

Further, in the embodiment, ventilation spaces N are formed in the radial direction between welded joint portions on the joint-side coil end 160*a*. Each ventilation space N has a thickness in the circumferential direction which is substantially at least as large as the thickness in the circumferential direction of each welded joint portion. As shown by an arrow E of FIG. 6, each ventilation space N acts as a ventilation path by the effect of the cooling fans 5, and, as a result, a ventilating resistance is reduced, and an amount of cooling wind is increased as well as interference noise can be lowered.

Figure 7:
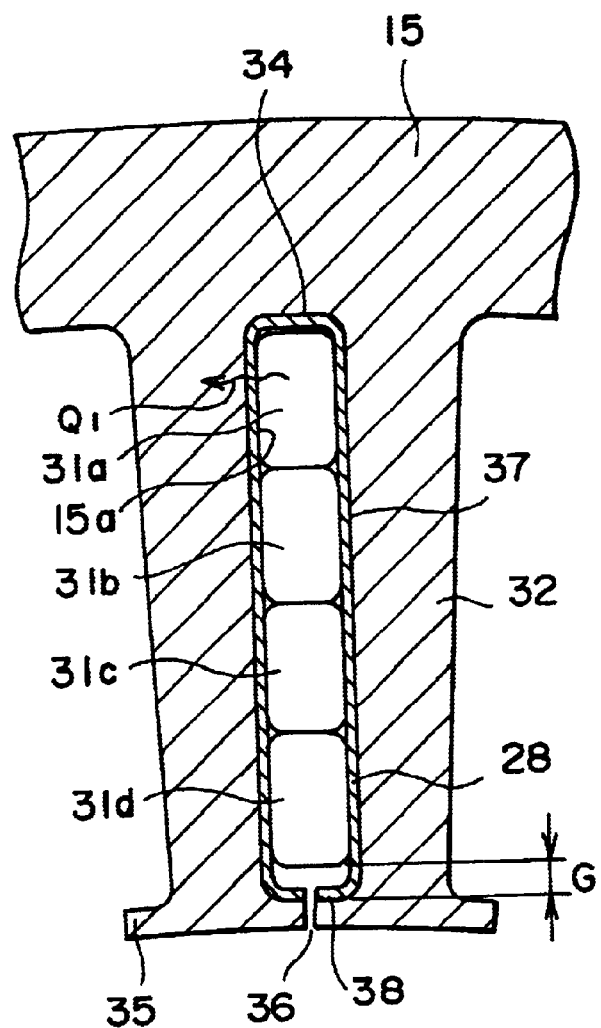
FIG. 7 is a sectional view of a slot of the stator core.

FIG. 7 is a sectional view of a slot of the stator core 15. In FIG. 7, the segments 31 are attached in the slots 15*a* between the teeth 32 of the stator core 15. Each of the segments 31 is composed of a flat square copper wire, and the rectangular shape of the segments 31 is formed by disposing them in four layers so that they are long in the radial direction.

Reference numerals 31*a*, 31*b*, 31*c*, and 31*d* denote the straight portions of the respective segments 31 attached in the slot 15*a*, reference numeral 34 denotes the outermost circumferential inner surface formed around the slot 15*a* of the stator core 15, reference numeral 35 denotes the inner circumferential extreme ends of the teeth 32 which are formed wide in the circumferential direction, and the gap 36 between the inner circumferential extreme ends is set very narrow. Reference numeral 37 denotes the side surfaces of the teeth 32, and reference numeral 38 denotes the inner circumferential surfaces of the extreme ends 35 of the teeth 32 on the slot side. Reference numeral 28 denotes a sheet-shaped insulation paper (electric insulating paper) interposed between the stator core 15 and the respective segments 31*a*, 31*b*, 31*c* and 31*d*.

The stator 8 is constructed as a coil having 4 turns for one slot by inserting a plurality of the substantially U-shaped segments 31 into the slots 15*a* of the stator core 15 from the lower side of the figure and connecting the ends thereof to each other on the joint-side coil end. In FIG. 6, this is composed of an inner diameter side joint portion and an outer diameter side joint portion. At the inner diameter side joint portion, the innermost layer segment 31*d* inserted into a slot A is jointed to the segment 31*c* at a second layer from the inner layer of a slot F which is 6 slots apart from the slot 15*a*. At the outer diameter side joint portion, the segment 31*b* located at third layer from the inner layer of the slot A is jointed to the segment 31*a* at the outermost layer of the slot F. The cross sectional area of the coil must be made as large as possible to reduce the resistance of the coil so that the heat generated by the coil is minimized. However, there is a possibility that the insulation films of the segments 31 are exfoliated by coming into contact with the core 15 when the segments 31 are inserted, which requires the provision of the insulation paper 28 or insulation resins between the segments 31 and the core 15 so that about 80% or less of a slot space is occupied by the segments 31.

According to the embodiment, in the cross section of the stator slot 15*a* of the stator core 15 into which the U-shaped segments 31 are inserted, the insulation paper 28 is caused to come into close contact with the teeth 32 of the core 15 and the segments 31 are caused to come into close contact with the insulation paper 28 in the circumferential direction of the stator 8, respectively and a gap G, which is larger than the space of the insulation paper 28, is formed in the radial direction of the stator 8 as shown in FIG. 7. That is, the gap G is formed in the radial direction between the segment 31*d* at the innermost layer in the radial direction and the inner circumferential surfaces 38 of the slot opening on the slot side. Then, the gap G is impregnated with varnish, whereby a varnish penetrating property can be improved.

Figure 8:
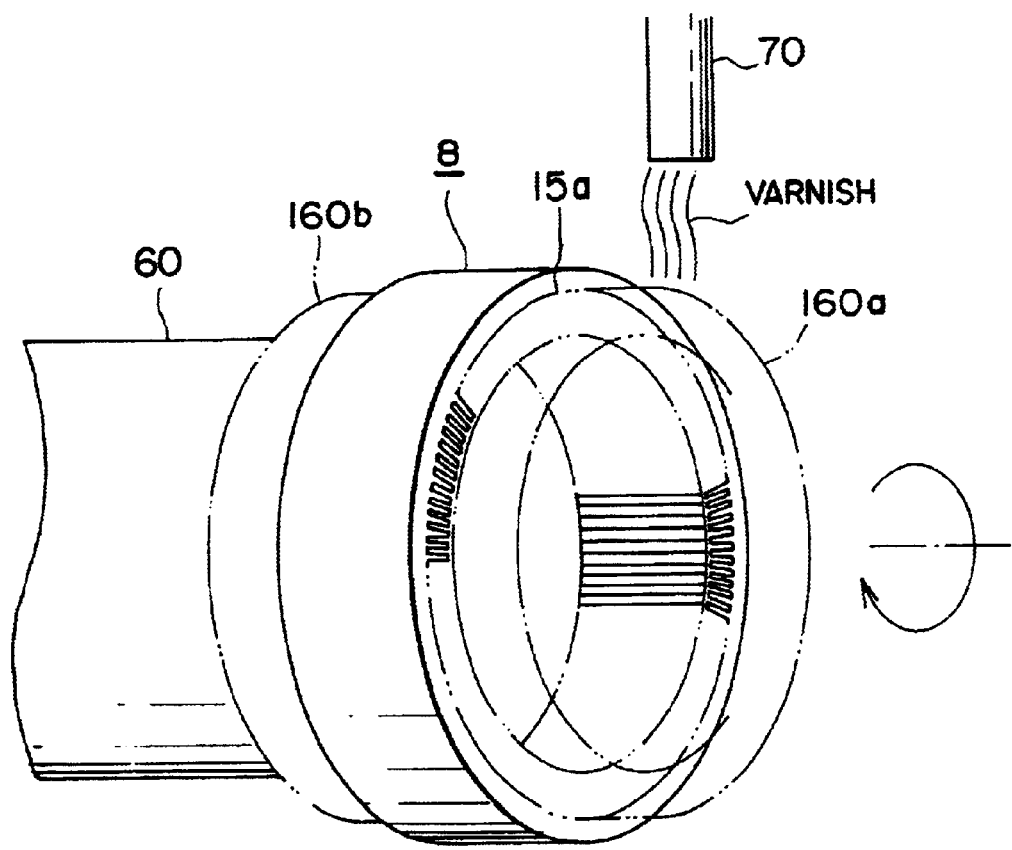
FIG. 8 is a perspective view showing an example of a method of impregnating the stator with varnish.
Figure 9:
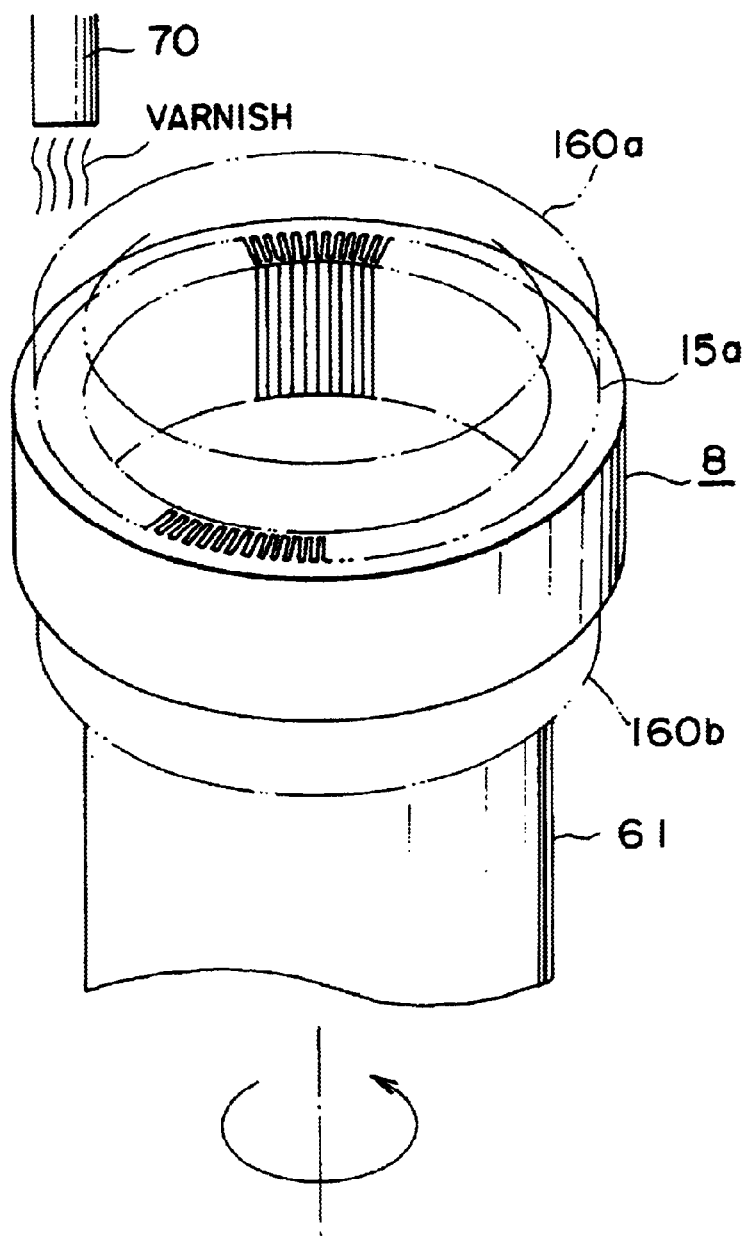
FIG. 9 is a perspective view showing another example of the method of impregnating the stator with varnish.
Figure 10:
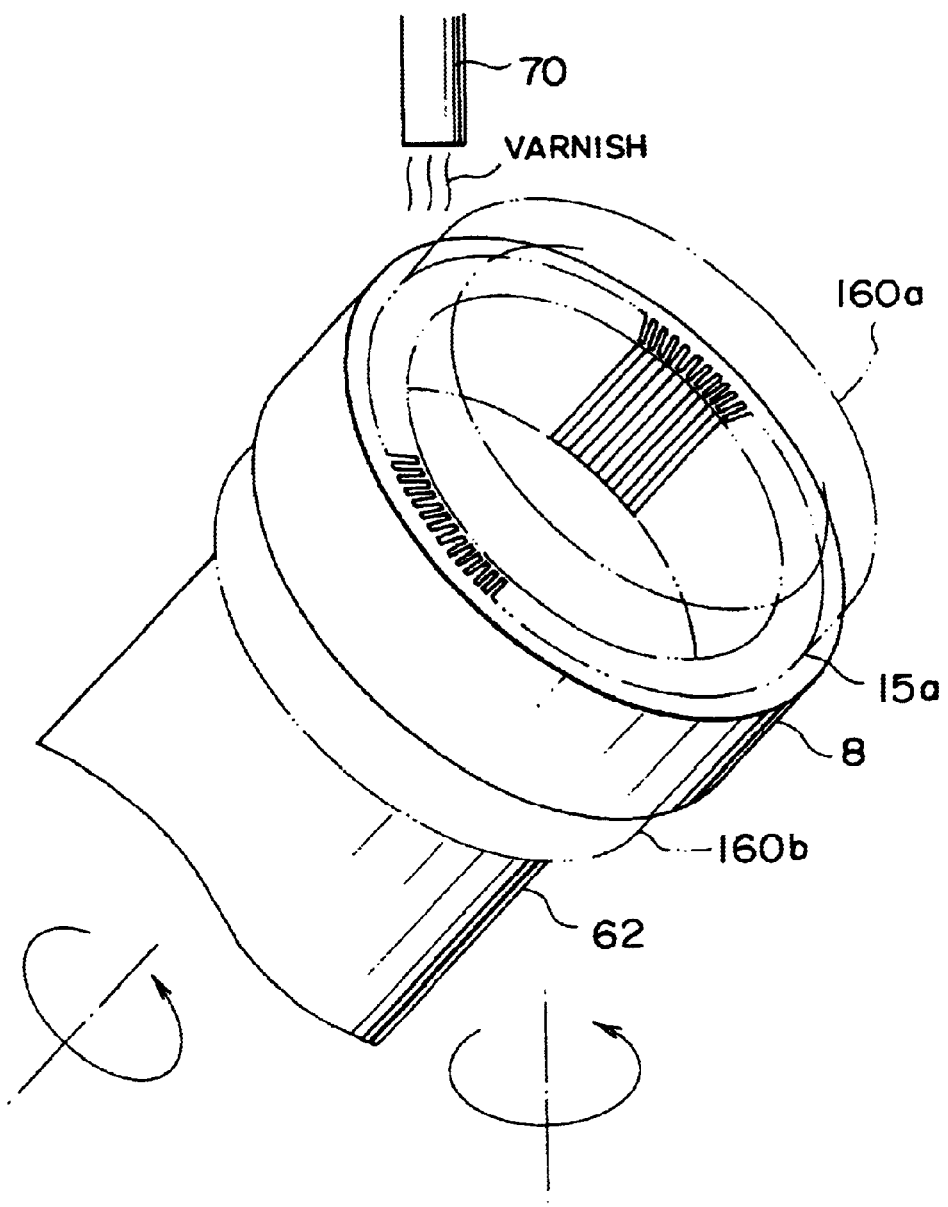
FIG. 10 is a perspective view showing still another example of the method of impregnating the stator with varnish.

FIGS. 8 to 10 are perspective views showing a method of impregnating the stator 8 with varnish. In FIG. 8, the stator 8 is supported on a support table 60 so as to be rotated about the axial center thereof which is held horizontally. Varnish is supplied dropwise onto both the coil ends 160*a* and 160*b* from a varnish supplier 70, which is disposed above the stator 8 in the outside diameter direction thereof, while the stator 8 is being rotated in the above state. At that time, the varnish supplier 70 supplies the varnish dropwise so that the average amount of application per unit area of the varnish, with which the joint-side coil end 160*a* is impregnated, is larger than the average amount of application per unit area of the varnish with which the turn-side coil end 160*b* is impregnated.

Further, also in the slot 15*a*, the varnish supplier 70 supplies varnish dropwise so that the average amount of application per unit area of the varnish, which penetrates into the joint-side coil end 160*a*, is larger than the average amount of application per unit area of the varnish which penetrates into the turn-side coil end 160*b*.

In the method of impregnating the stator 8 with varnish, varnish is supplied dropwise from the outside diameter direction of the stator core 15 so as to impregnate the coil ends 160*a* and 160*b* with the varnish. As a result, even if the varnish is supplied dropwise from the outside diameter direction of the stator core 15, the coil ends 160*a* and 160*b* can be sufficiently impregnated with the varnish. Further it is possible to individually control the amounts of the varnish necessary to both the coil ends 160*a* and 160*b* so as to increase the amount of it supplied to the coil end 160*a* on the bent and jointed side.

In FIG. 9, the stator 8 is supported on a support table 61 so as to be rotated about the axial center thereof which is held vertically. Varnish is supplied dropwise onto both the coil ends 160*a* and 160*b* from the varnish supplier 70, which is disposed above the stator 8 in the outside diameter direction thereof, while the stator 8 is being rotated in the above state. At that time, the varnish supplier 70 supplies the varnish dropwise so that the average amount of application per unit area of the varnish, with which the joint-side coil end 160*a* is impregnated, is larger than the average amount of application per unit area of the varnish with which the turn-side coil end 160*a* is impregnated.

In FIG. 10, the stator 8 is supported on a support table 62 so as to be rotated about the axial center thereof which is inclined 45° with respect to a vertical line. The support table is simultaneously rotated about two axis, that is, about the axial center thereof and about the vertical direction. Varnish is supplied dropwise onto both the coil ends 160*a* and 160*b* from the varnish supplier 70, which is disposed above the stator 8 in the outside diameter direction thereof, while the stator 8 is being rotated about the two axes. At that time, the varnish supplier 70 supplies the varnish dropwise so that the average amount of application per unit area of the varnish, with which the joint-side coil end 160*a* is impregnated, is larger than the average amount of application per unit area of the varnish with which the turn-side coil end 160*a* is impregnated.

In the method of impregnating the stator 8 with varnish, the varnish is gelled and dried in the state in which the joint-side coil end 160*a* is located at a position higher than that of the turn-side coil end 160*b*, which can improve the penetrating property of varnish from the joint-side to the turn-side.

In the automotive alternator constructed as described above, the insulation of the join side having no insulation film can be improved without using varnish, with which the coil ends are impregnated, in an amount not larger than necessary. Further, a drop of an output and deterioration of magnetic noise which would be otherwise caused by the short-circuit of the joint-side coils having no insulation film can be prevented. Furthermore, while a load due to residual stress is applied to the joint-side coil end 160*a* when it is deformed by being bent, the mechanical fastening force thereof can be increased by increasing the amount of varnish.

It should be noted that, in the embodiment, the average amount of application per unit area of the varnish, with which the joint-side coil end 160*a* is impregnated, is larger than the average amount of application per unit area of the varnish with which the turn-side coil end 160*b* is impregnated. However, it may be also possible, on the contrary, that the average amount of application per unit area of the varnish, with which the turn-side coil end 160*b* is impregnated, is larger than the average amount of application per unit area of the varnish with which the joint-side coil end 160*a* is impregnated. With the above construction, the rigidity of the overall stator 8 can be increased. That is, the rigidity of the turn-side (counter-joint-side) coil end 160*b*, where the curved portions of the U-shaped segments 31 are aligned, is higher than the rigidity of the joint-side coil end 160*a* because the counter-joint-side coil end 160*a* has no connecting portions. However, the rigidity of the coil ends can be more increased by impregnating the gaps between the counter-joint-side coils with varnish so as to increase the average amount of application of varnish. As a result, the rigidity of the overall stator 8 can be increased.

Further, in the automotive alternator constructed as described above, the case 3 is disposed so as to surround both the coil ends 160a and 160b of the stator 8 from the outer circumferential side thereof, and at least one side of the case 3 includes the plurality of window portions (the air intake vents 1a and 2a and the air discharge vents 1b and 2b) outwards of the coil ends 160a and 160b in the radial direction thereof. That is, the case 3 having the plurality of window portions is disposed so as to surround the coil ends 160a and 160b of the stator 8 from the outer circumferential side thereof, improving the cooling property of the coil ends 160a and 160b. Further, the present invention is preferable to cope with the water and foreign materials entering through the window portions of the case 3 on the joint-side.

The cooling fans 5 are mounted on both the ends of the rotor 7 in the axial direction thereof, more improving the cooling property of the rotor 7.

One of the cooling fans 5 is mounted on the end of the rotor 7 in the axial direction thereof in the vicinity of the joint-side coil end 160a, compensating the deterioration of the cooling property of the joint-side coil end 160a caused by the varnish deposited thereon.

The other of the cooling fans 5 is mounted on the end of the rotor 7 in the axial direction thereof in the vicinity of the turn-side coil end 160b which includes a smaller amount of varnish, more improving the cooling property of the turn-side coil end 160b.

The ventilation spaces N are formed in the radial direction between the welded joint portions on the joint-side coil end 160a, and the thickness of each ventilation space N in the circumferential direction is substantially at least as large as the thickness in the circumferential direction of each welded joint portion. As a result, the provision of the ventilation spaces N with the portion where the cooling fans 5 faces each other can reduce a ventilation resistance, can increase an amount of cooling wind and can lower interference noise.

When the fan 5, which faces the joint-side coil end 160a, is projected onto the surface parallel with the rotating shaft 6 of the rotor 7, it is overlapped with the turn-side coil end 160b. Accordingly, the cooling fan 5 facing the joint-side stator coil 160a is overlapped with the welded joint portions at least in the axial direction, which improves the thermal conductivity of the welded joint portions and further improves the cooling property thereof.

Further, in the embodiment, the rectifiers 12 are disposed on the counter-joint-side having a higher cooling property, making it difficult for the rectifiers 12 to be thermally influenced by the counter-joint-side coil end. Note that, when the rectifiers 12 are disposed on the joint-side, the amount of varnish can be reduced without causing a drawback such as the short-circuit between the rectifiers 12 and the joint-side because a large amount of varnish is applied to the joint-side.

The amount of cooling wind for ventilating and cooling the joint-side coil end 160a is larger than the amount of cooling wind for ventilating and cooling the turn-side coil end 160b. That is, the joint-side coil end 160a and the turn-side coil end 160b can be cooled in good balance because the amount of the cooling wind for ventilating and cooling the joint-side coil end 160a, which has low thermal conductivity due to the varnish applied thereto in a large amount, is larger than the amount of the cooling wind for ventilating and cooling the turn-side coil end 160b.

The speed of the wind for ventilating and cooling the joint-side coil end 160a is larger than the speed of the cooling wind for ventilating and cooling the turn-side coil end 160b, permitting the cooling property of the joint-side coil end 160a, which has the large amount of varnish and the low thermal conductivity, to be improved so as to cool the joint-side coil end 160a and the turn-side coil end 160b in good balance.

It should be noted that the varnish, with which the joint-side coil end 160a is impregnated, may fill the spaces between the respective segments 31, which are formed by being bent and inclined in the circumferential direction of the stator 8, without leaving substantially any gaps having no varnish in the segments 31. When the segments 31 are fastened through the varnish filling the spaces therebetween as described above, a drop of an output and deterioration of magnetic noise, which would be caused by the short-circuit of the joint portion due to the vibration and the like thereof, can be prevented. Further, the inner circumferential surface of the coil ends are made flat because the varnish fills the spaces between the respective segments 31 without leaving substantially any gaps having no varnish in the segments 31, reducing the interference noise caused by the rotation of the claw-shaped magnetic poles of the rotor 7 and the rotation of the fans.

Note that, in the embodiment, varnish is supplied dropwise so that the average amount of application per unit area of the varnish, with which the joint-side coil end 160a is impregnated, is larger than the average mount of application per unit area of the varnish with which the turn-side coil end 160b is impregnated. However, the turn-side coil end 160b may be impregnated with no varnish. With this construction, the amount of varnish can be more reduced.

While the three-phase alternator the stator of which has the sixteen poles and the ninety-six (96) slots is exemplified in the above description, the present invention is by no means limited thereto and also is applicable to a three-phase alternator the stator of which has twelve poles and thirty six (36) slots, to a three-phase alternator the stator of which has twelve poles and the seventy-two (72) slots, and to a three-phase alternator the stator of which has sixteen poles and forty-eight (48) slots.

Further, the present invention can be also preferably applied to many other types of three-phase alternators the stator of which has twenty (20) poles and one-hundred-and-twenty (120) slots, and the like.

Embodiment 2

Figure 11:
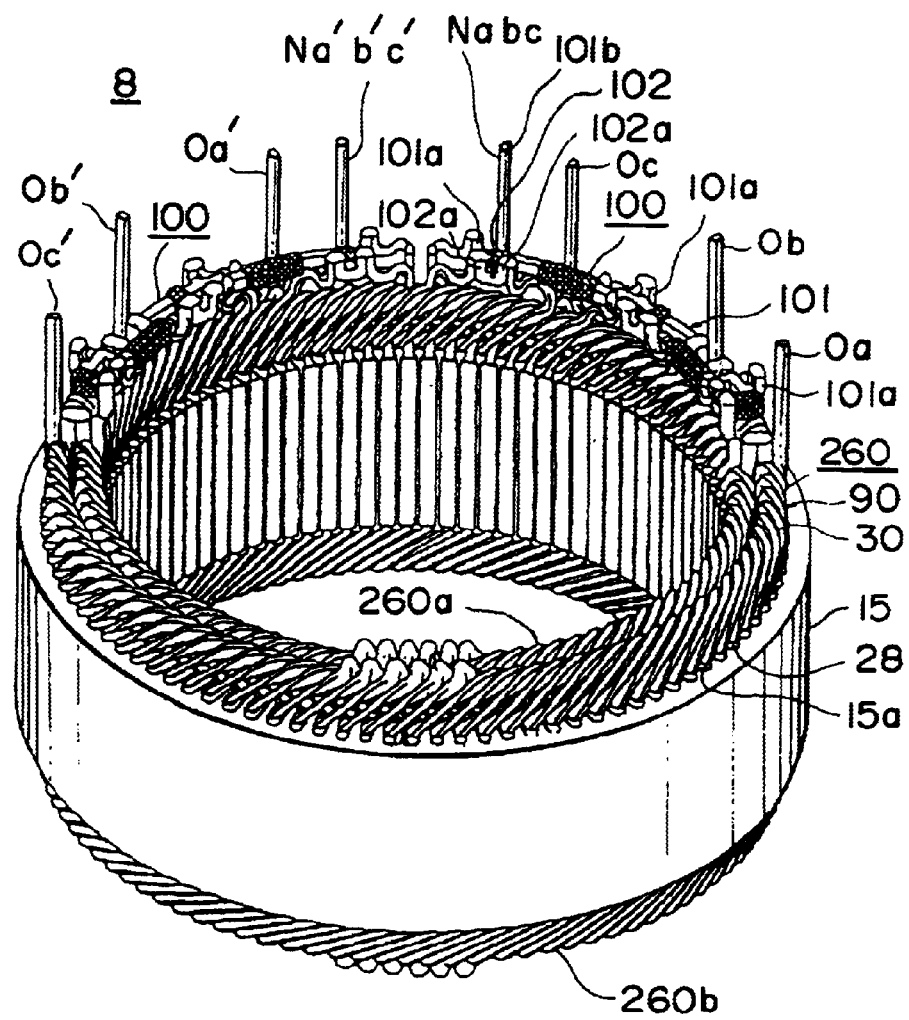
FIG. 11 is a perspective view showing a stator for the automotive alternator in an embodiment 2 of the present invention.
Figure 12:
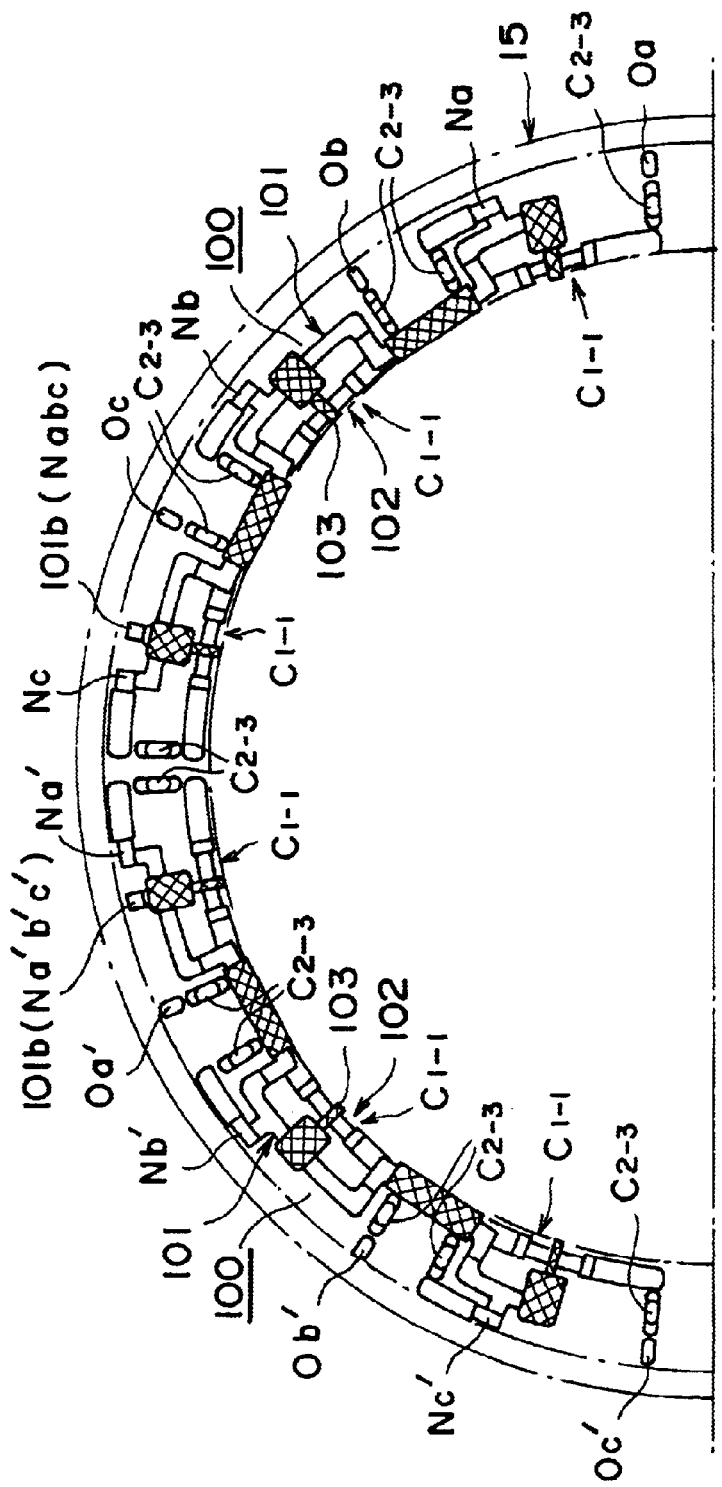
FIG. 12 is a front elevational view showing part of the stator of the automotive alternator.
Figure 13:
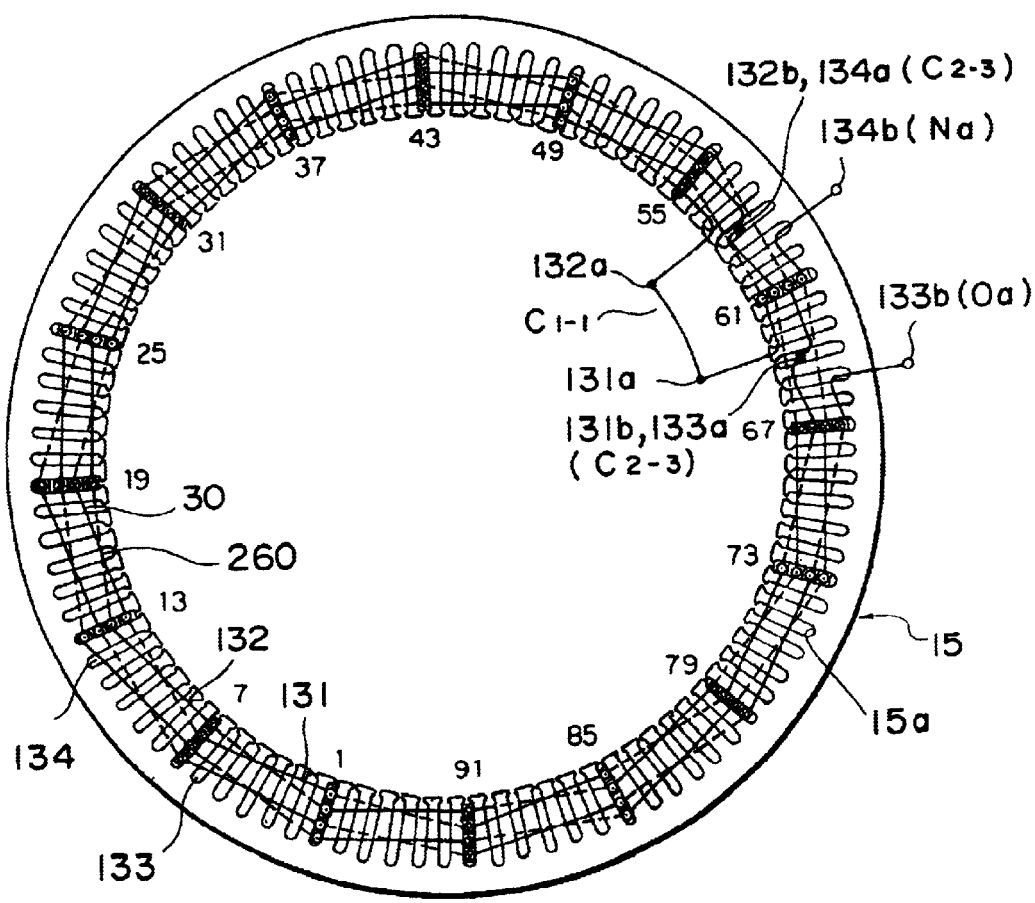
FIG. 13 is a front elevational view explaining connections in one stator winding phase portion in the automotive alternator.
Figure 14:
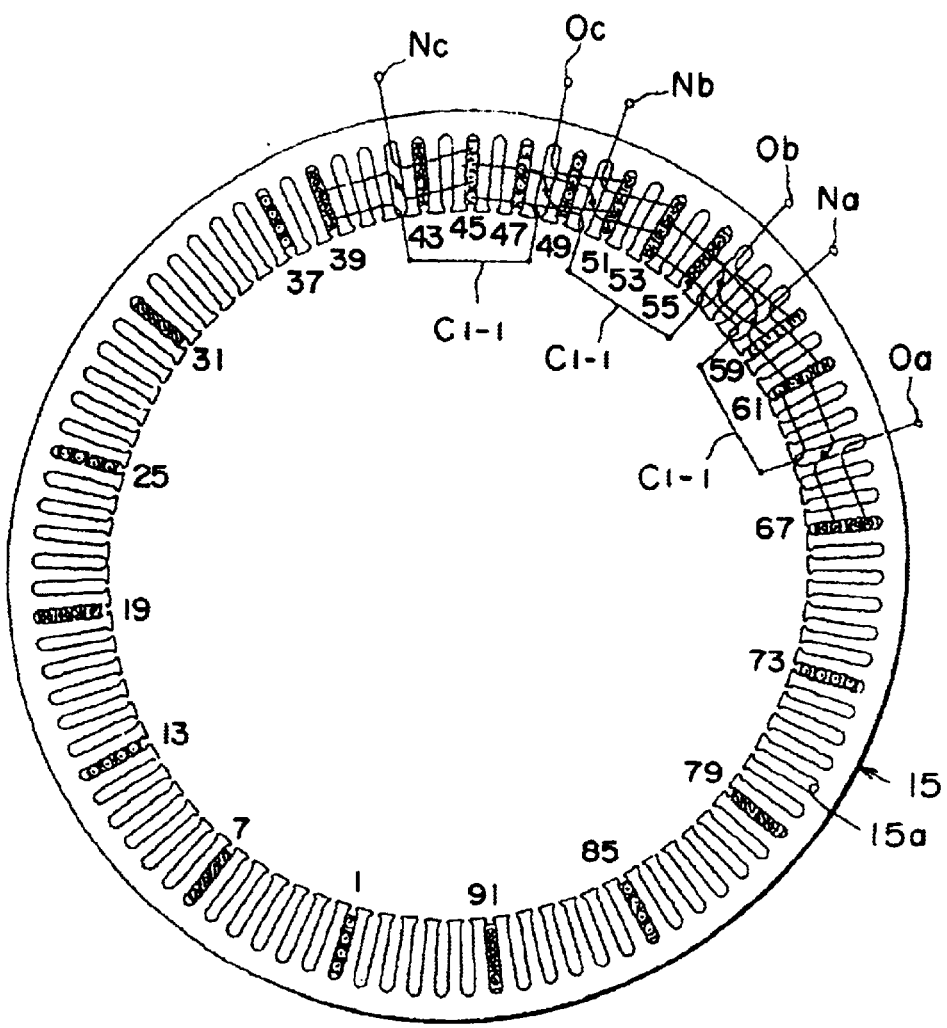
FIG. 14 is a front elevational view explaining connections among three stator winding phase portions in the automotive alternator.
Figure 15:
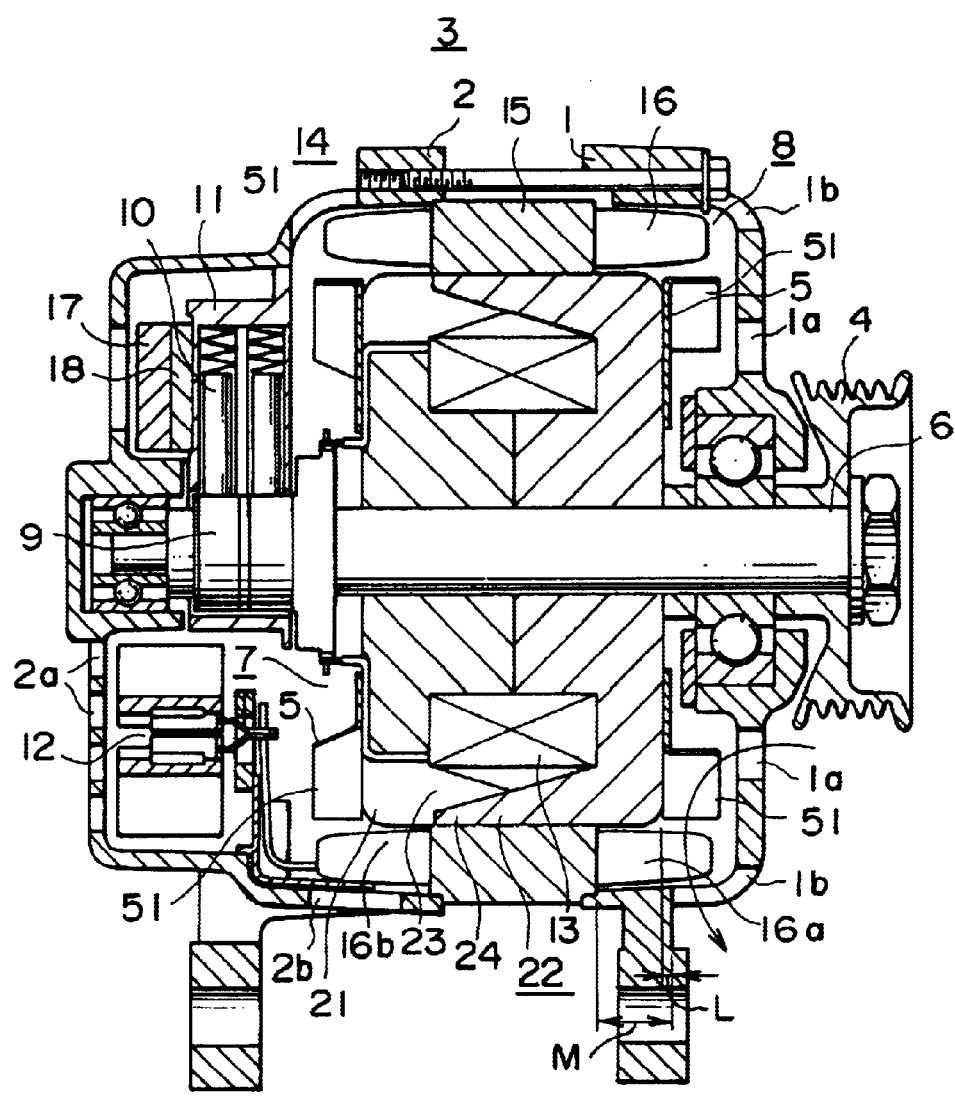
FIG. 15 is a sectional view showing a conventional automotive alternator.
Figure 16:
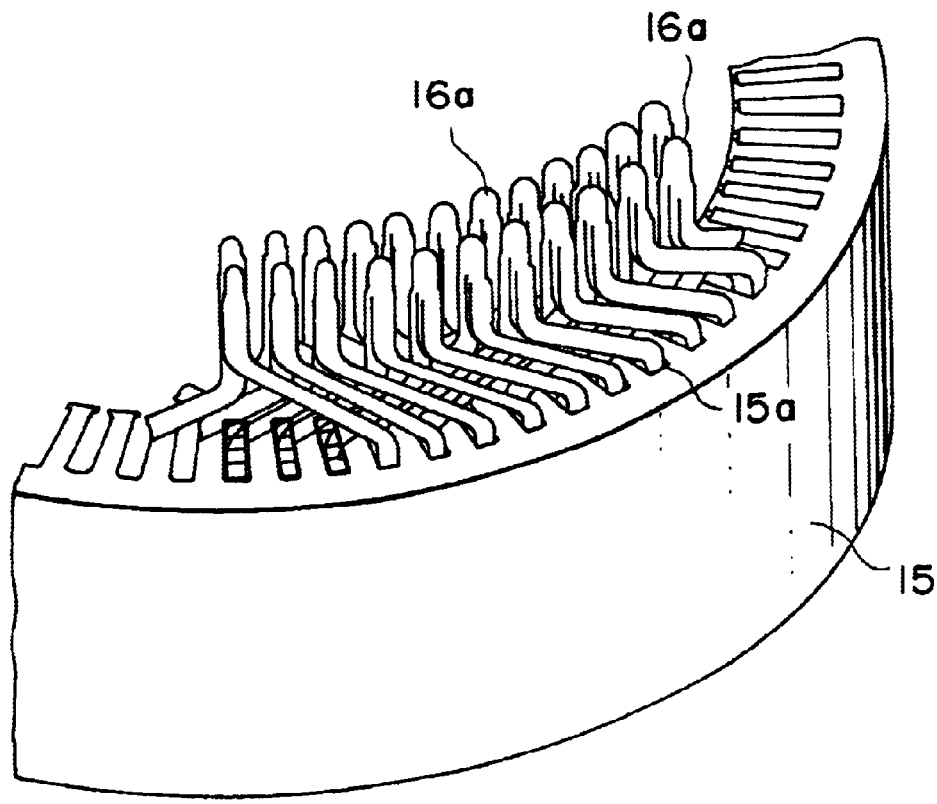
FIG. 16 is a view showing how a winding is constructed by inserting a U-shaped segment into a stator core in a conventional art.
Figure 16:
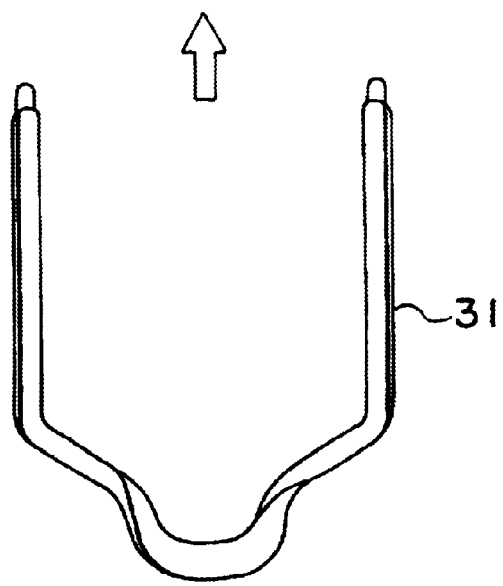

FIG. 11 is a perspective view showing a stator for the automotive alternator in an embodiment 2 of the present invention; FIG. 12 is a front elevational view showing part of the stator of the automotive alternator; FIG. 13 is a front elevational view explaining connections in one stator winding phase portion in the automotive alternator; and FIG. 14 is a front elevational view explaining connections among three stator winding phase portions in the automotive alternator.

In the embodiment, as shown in FIGS. 11 and 12, the stator 8 includes: a cylindrical stator core 15 composed of a laminated core formed with a plurality of slots 15a extending axially at a predetermined pitch in a circumferential direction; a stator winding 16 wound onto the stator core 15; and insulators 19 installed in each of the slots 15a for electrically insulating the stator winding 16 from the stator core 15. The stator winding 16 includes two winding assemblies 90 disposed in two rows in a radial direction. The winding assemblies 90 include a plurality of winding sub-portions in each of which one long strand of wire 30 is bent back outside the slots 15a at end surfaces of the stator core 15 and wound into a wave winding so as to alternately occupy an inner layer and an outer layer in a slot depth direction within the slots 15*a* a predetermined number of slots apart. The winding sub-portions are connected into three-phase alternating-current connections using three-phase alternating-current terminals 100 to form two three-phase alternating-current windings 260, which are described below.

Then, the turned portions of the strand of wire 30 bent back outside the slots 15*a* are arranged in the circumferential direction to constitute coil ends. That is, a joint-side coil end 260*a*, where a plurality of windings are connected on the coil end on a first side of the stator iron core 15, and a counter-joint-side coil end 260*b*, which is located at a position opposite to the joint-side coil end 260*a*, are formed.

It should be noted that, in FIGS. 11 and 12, Oa, Ob, Oc, Na, Nb, and Nc represent output wires and neutral points of respective phase portions of a first three-phase alternating-current winding, Nabc represents a neutral-point lead wire of the first three-phase alternating-current winding, Oa', Ob', Oc', Na', Nb', and Nc' represent output wires and neutral points of respective phase portions of a second three-phase alternating-current winding, and Na'b'c' represents a neutral-point lead wire of the second three-phase alternating-current winding. Furthermore, $C_{1-1}$ represents the same-address crossover connections between first addresses described below, and $C_{2-3}$ represents adjacent-address crossover connections between a second address and a third address.

In this case, the stator core 15 is formed with ninety-six slots 15*a* at even pitch so as to house the two three-phase alternating-current windings such that the number of slots housing each phase portion of the alternating-current windings corresponds to the number of magnetic poles (sixteen) in the rotor 7. In other words, there are two slots per pole per phase. Long, insulated copper wire material having a rectangular cross section, for example, is used in the strands of wire 30.

Next, the winding construction of one stator winding phase portion 260 will be explained in detail with reference to FIG. 13.

One stator winding phase portion 260 is composed of first to fourth winding sub-portions 131 to 134 each formed from one strand of wire 30. The first winding sub-portion 131 is formed by wave winding one strand of wire 30 into every sixth slot from slot numbers 1 to 91 so as to alternately occupy a first position from an inner circumferential side and a second position from the inner circumferential side inside the slots 15*a*. The second winding sub-portion 132 is formed by wave winding a strand of wire 30 into every sixth slot from slot numbers 1 to 91 so as to alternately occupy the second position from the inner circumferential side and the first position from the inner circumferential side inside the slots 15*a*. The third winding sub-portion 133 is formed by wave winding a strand of wire 30 into every sixth slot from slot numbers 1 to 91 so as to alternately occupy a third position from the inner circumferential side and a fourth position from the inner circumferential side inside the slots 15*a*. The fourth winding sub-portion 132 is formed by wave winding a strand of wire 30 into every sixth slot from slot numbers 1 to 91 so as to alternately occupy the fourth position from the inner circumferential side and the third position from the inner circumferential side inside the slots 15*a*.

Thus, each of the first to fourth winding sub-portions 131 to 134 constitutes a winding sub-portion having one turn in which a single strand of wire 30 is wound into every sixth slot 15*a* so as to alternately occupy an inner layer and an outer layer in a slot depth direction. The strands of wire 30 are arranged to line up in a row of four strands in a radial direction within each slot 15*a* with the longitudinal direction of their rectangular cross sections aligned in a radial direction. Hereinafter, the positions of the strands of wire 30 within the slots 15*a* will be called the first address, the second address, the third address, and the fourth address, respectively, from the inner circumferential side.

Moreover, although not shown, a total of six stator winding phase portions 260 are formed by offsetting the slots 15*a* into which the strands of wire 30 are wound by one slot each.

At a first end of the stator core 15, a crossover connection (adjacent-address crossover connection $C_{2-3}$) is formed between a second end portion 131*b* of the first winding sub-portion 131 extending outwards from the second address of slot number 67 and a first end portion 133*a* of the third winding sub-portion 133 extending outwards from the third address of slot number 61, and a crossover connection (adjacent-address crossover connection $C_{2-3}$) is formed between a second end portion 132*b* of the second winding sub-portion 132 extending outwards from the second address of slot number 61 and a first end portion 134*a* of the fourth winding sub-portion 134 extending outwards from the third address of slot number 55, and in addition, a crossover connection (same-address crossover connection $C_{1-1}$) is formed between a first end portion 131*a* of the first winding sub-portion 131 extending outwards from the first address of slot number 61 and a first end portion 132*a* of the second winding sub-portion 132 extending outwards from the first address of slot number 55. Thus, the first to fourth winding sub-portions 131 to 134 are connected in series to form one stator winding phase portion 260 having four turns, namely, the stator winding a-phase portion.

At this time, a second end portion 133*b* of the third winding sub-portion 133 extending outwards from the fourth address of slot number 67 and a second end portion 134*b* of the fourth winding sub-portion 134 extending outwards from the fourth address of slot number 61 become an output wire (Oa) and a neutral point (Na), respectively, of the stator winding a-phase portion.

Similarly, as shown in FIG. 14, in the wire-strand groups wound into a slot group including slot numbers 5, 11, ..., and 95, a crossover connection (adjacent-address crossover connection $C_{2-3}$) is formed between a second end portion 131*b* of the first winding sub-portion 131 extending outwards from the second address of slot number 59 and a first end portion 133*a* of the third winding sub-portion 133 extending outwards from the third address of slot number 53, and a crossover connection (adjacent-address crossover connection $C_{2-3}$) is formed between a second end portion 132*b* of the second winding sub-portion 132 extending outwards from the second address of slot number 53 and a first end portion 134*a* of the fourth winding sub-portion 134 extending outwards from the third address of slot number 47, and in addition, a crossover connection (same-address crossover connection $C_{1-1}$) is formed between a first end portion 31*a* of the first winding sub-portion 131 extending outwards from the first address of slot number 53 and a first end portion 132*a* of the second winding sub-portion 132 extending outwards from the first address of slot number 47. Thus, the first to fourth winding sub-portions 131 to 134 are connected in series to form a stator winding b-phase portion having four turns. A second end portion 133*b* of the third winding sub-portion 133 extending outwards from the fourth address of slot number 59 and a second end portion 134*b* of the fourth winding sub-portion 134 extending outwards from the fourth address of slot number 53 become an output wire (Ob) and a neutral point (Nb), respectively, of the stator winding b-phase portion.

Similarly, as shown in FIG. 14, in the wire-strand groups wound into a slot group including slot numbers 3, 9, . . . , and 93, a crossover connection (adjacent-address crossover connection $C_{2-3}$) is formed between a second end portion 132b of the second winding sub-portion 132 extending outwards from the second address of slot number 51 and a first end portion 134a of the fourth winding sub-portion 134 extending outwards from the third address of slot number 45, and a crossover connection (adjacent-address crossover connection $C_{2-3}$) is formed between a second end portion 131b of the first winding sub-portion 131 extending outwards from the second address of slot number 45 and a first end portion 133a of the third winding sub-portion 133 extending outwards from the third address of slot number 39, and in addition, a crossover connection (same-address crossover connection $C_{1-1}$) is formed between a first end portion 132a of the second winding sub-portion 132 extending outwards from the first address of slot number 45 and a first end portion 131a of the first winding sub-portion 131 extending outwards from the first address of slot number 39. Thus, the first to fourth winding sub-portions 131 to 134 are connected in series to form a stator winding c-phase portion having four turns. A second end portion 134b of the fourth winding sub-portion 134 extending outwards from the fourth address of slot number 51 and a second end portion 133b of the third winding sub-portion 133 extending outwards from the fourth address of slot number 45 become an output wire (Oc) and a neutral point (Nc), respectively, of the stator winding c-phase portion.

In the stator winding a-phase portion, the stator winding b-phase portion, and the stator winding c-phase portion of the above construction, the same-address crossover connections $C_{1-1}$ are in the same address, namely the first address, and are disposed at a pitch of eight slots from each other. The three output wires Oa, Ob, and Oc are also disposed at a pitch of eight slots from each other, and in addition the three neutral points Na, Nb, and Nc are also disposed at a pitch of eight slots from each other.

In the wire-strand groups wound into a slot group including slot numbers 2, 8, . . . , and 92, a stator winding a'-phase portion is formed by similarly connecting each of the strands of wire 30, in the wire-strand groups wound into a slot group including slot numbers 6, 12, . . . , and 96, a stator winding b'-phase portion is formed by similarly connecting each of the strands of wire 30, and in the wire-strand groups wound into a slot group including slot numbers 4, 10, . . . , and 94, a stator winding c'-phase portion is formed by similarly connecting each of the strands of wire 30.

In the embodiment, the average amount of application per unit area of the varnish, with which the joint-side coil end 260a is impregnated, is larger than the average amount of application per unit area of the varnish with which the counter turn-side coil end 260b is impregnated. With this construction, the total amount of deposition of varnish can be reduced without reducing the amount of the varnish applied to minimum necessary sections, which minimizes the reduction of the cooling property of the coil ends caused by the deposition of the varnish as well as reduces a varnish cost.

The effects, which can be obtained by mounting the stator 8 constructed as described above on an alternator, will be described below.

First, the coil ends are composed of the turned portions 30a of the strands of wire 30, which greatly reduces the number of the joint positions in the coil ends 260a and 260b. With this construction, the strands of wire 30 are not softened by welding, the rigidity of the stator is increased and magnetic noise can be reduced.

Further, the coil ends 260a and 260b are constructed by disposing the turned portions 30a in the circumferential direction, reducing the height of a coil end group extending from the end surface of the stator core 15 as compared with a conventional coil end group in which the ends of conductor segments are connected to each other. With this construction, the ventilation resistance of the coil ends 260a and 260b can be reduced, which allows wind the noise caused by the rotation of a rotor 7 to be reduced. Further, the leakage reactance of the coils of the coil ends is reduced and an output efficiency is improved.

Furthermore, the four strands of wire 30 are arranged in the slots 15a in a row in the radial direction, and the turned portions 30a are arranged in two rows in the circumferential direction. With this construction, the turned portions 30a, which constitute the coil ends 260a and 260b, are dispersed in two rows in the radial direction, respectively, permitting the height of the coil ends 260a and 260b extending from the end surface of the stator core 15 to be reduced. As a result, the ventilation resistance of the coil ends 260a and 260b are reduced, reducing the wind noise caused by the rotation of the rotor 7.

Note that, in the embodiment, the average amount of application per unit area of the varnish, with which the joint-side coil end 260a is impregnated, is larger than the average amount of application per unit area of the varnish with which the counter turn-side coil end 260b is impregnated. However, it may be also possible, on the contrary, that the average amount of application per unit area of the varnish, with which the counter turn-side coil end 260b is impregnated, is larger than the average amount of application per unit area of the varnish with which the joint-side coil end 260a is impregnated. With this construction, the rigidity of the overall stator 8 can be increased. That is, the rigidity of the counter-joint-side, where the turned portions of strands of wire 30 are aligned, is higher than the rigidity of the joint-side because the counter turn-side has no connecting positions. However, the rigidity of the coil ends can be more increased by impregnating the gaps between the counter-joint-side coils with varnish so as to increase the average amount of the varnish applied to the coil ends, whereby the rigidity of the overall stator 8 can be increased.

In each of the above embodiments, copper wire material having a rectangular cross section is used in the strands of wire, but the strands of wire are not limited to copper wire material having a rectangular cross section, and may, for example, be a copper wire material having a circular cross section. In that case, formability of the strands of wire is enhanced, facilitating easy placement and connection of the strands of wire, and improving the workability. Further, the strands of wire are not limited to copper wire material, and may, for example, be an aluminium wire material.

In each of the above embodiments, four strands of wire are arranged so as to line up in a row radially within each slot and the turn portions are arranged to line up in two rows circumferentially, but six strands of wire may be arranged so as to line up in a row radially within each slot and the turn portions are arranged to line up in three rows circumferentially, or eight strands of wire are arranged so as to line up in a row radially within each slot and the turn portions are arranged to line up in four rows circumferentially.

According to the one aspect of the invention, in the stator for the automotive alternator including the rotor, which has the claw-shaped magnetic poles fitted on the rotating shaft and the fans, and the stator, which is disposed around the outer circumference of the rotor, has the coil wound therearound and connected into the three-phase alternating-current connections, and is ventilated and cooled by the fans, wherein the stator includes the stator core in which the plurality of slots are formed and the stator winding wound around the stator core, the stator winding being composed of the plurality of electric conductors jointed to each other, the electric conductors include the plurality of winding sub-portions in each of which the one long strand of wire is bent back outside the slots at the end surfaces of the stator core and wound into the wave winding so as to alternately occupy the inner layer and the outer layer in the slot depth direction within the slots a predetermined number of slots apart, and the turned portions of the strands of wire bent back outside the slots at both the end surfaces of the stator core are disposed in the circumferential direction so as to constitute the joint-side coil end and the turn-side coil end, and the plurality of windings sub-portions are connected to each other on the joint-side coil end at the first end of the stator core, the stator for the automotive alternator is characterized in that the average amount of application per unit area of any one of the varnish, with which the joint-side coil end is impregnated and the varnish, with which the counter-joint-side coil end is impregnated, is larger than the average amount of application per unit area of the other of the varnishes.

Therefore, the total amount of deposition of varnish can be reduced without reducing the amount of varnish applied to minimum sections, which minimizes the reduction of a cooling property caused by the deposition of varnish as well as reduces a varnish cost.

According to the another aspect of the invention, in the stator for the automotive alternator including the rotor, which has the claw-shaped magnetic poles fitted on the rotating shaft and the fans, and the stator, which is disposed around the outer circumference of the rotor, has the coil wound therearound and connected into the three-phase alternating-current connections, and is ventilated and cooled by the fans, wherein, the stator includes the stator core in which the plurality of slots are formed and the stator winding wound around the stator core, the stator winding being composed of the plurality of electric conductors jointed to each other, the electric conductors are formed by being bent in the circumferential direction and jointed to each other so that the conductor segments are connected to other conductor segments, which are located at the different slots, at the open ends thereof, and the plurality of conductor segments are connected on the joint-side coil end at the first end of the stator core, the stator for the automotive alternator is characterized in that the average amount of application per unit area of any one of the varnish, with which the joint-side coil end is impregnated and the varnish, with which the counter-joint-side coil end is impregnated, is larger than the average amount of application per unit area of the other of the varnishes.

Therefore, the total amount of deposition of varnish can be reduced without reducing the amount of varnish applied to minimum sections, which minimizes the reduction of a cooling property caused by the deposition of varnish as well as reduces a varnish cost.

The average amount of application per unit area of the varnish, with which the joint-side coil end is impregnated, is larger than the average amount of application per unit area of the varnish, with which the counter-joint-side coil end is impregnated.

Therefore, the insulation of the joint-side having no insulation film can be improved. Further, a drop of an output and deterioration of magnetic noise which would be otherwise caused by the short-circuit of the joint-side having no insulation film can be prevented. Furthermore, when the joint-side is bent and deformed, a load due to residual stress caused at the time is applied thereto. However, the mechanical fastening force of the joint-side can be increased by increasing an amount of varnish.

The average amount of application per unit area of the varnish, with which the counter-joint-side coil end is impregnated, is larger than the average amount of application per unit area of the varnish, with which the joint-side coil end is impregnated.

While the rigidity of the coil end of the counter-joint-side, where the turned portions of the strands of wire or the curved portions of the conductor segments which are bent back outside the slots, respectively are aligned, is higher than the rigidity of the coil end of the joint-side because the counter-joint-side has no connecting portions. However, the rigidity of the coil ends can be more increased by impregnating the gaps between the coils of the counter-joint-side with varnish so as to increase the average amount of application of varnish. As a result, the rigidity of the overall stator can be increased.

The amount of the varnish, with which the joint-side coil end is impregnated in the slots, is larger than the amount of the varnish, with which the counter-joint-side coil end is impregnated in the slots.

In the slots, the gap between the ends of the stator and the electric conductors is larger on the joint-side coil end where the electric conductors are bent and jointed to each other. However, the mechanical fastening force of the joint-side can be increased by relatively increasing the amount of the varnish applied to the joint-side.

The amount of the varnish, with which the counter-joint-side coil end is impregnated in the slots, is larger than the amount of the varnish, with which the joint-side coil end is impregnated in the slots.

While the rigidity of the coil end of the counter-joint-side, where the turned portions of the strands of wire or the curved portions of the U-shaped segments which are bent back outside the slots, respectively are aligned, is higher than the rigidity of the coil end of the joint-side because the counter-joint-side has no connecting portions. However, the rigidity of the coil ends can be more increased by increasing the amount of the varnish in the slots of the counter-joint-side. As a result, the rigidity of the overall stator can be increased.

The counter-joint-side coil end is impregnated with no varnish.

Therefore, the cooling property of the counter-joint-side coil end can be increased, and the amount of varnish can be reduced as a whole.

The varnish, with which the joint-side coil end is impregnated, fills the spaces between the electric conductors inclined in the circumferential direction of the stator without leaving substantially any gaps having no varnish.

Therefore, in the joint-side coil end, the varnish to be penetrated fills the spaces between the respective coils, which are inclined in the circumferential direction of the stator, without leaving substantially any gaps having no varnish in the coils so as to fasten them, preventing a drop of an output and deterioration of magnetic noise which would be caused by the short-circuit of the joint portion due to the vibration and the like thereof. Further, the inner circumferential surface of the coil ends are made flat because the varnish fills the spaces between the coils without leaving substantially any portion having no varnish, which can reduce interference noise caused by the rotation of the claw-shaped magnetic poles of the rotor and the rotation o the fans.

The gap between the coils, which are inclined in the circumferential direction of the stator, of the joint-side coil end is smaller than the gap of the respective coils, which are inclined in the circumferential direction of the stator, of the counter-joint-side coil end.

Therefore, the insulation of the joint-side coil end is improved due to a larger amount of varnish applied thereto, permitting the gaps between the respective coils, which are inclined in the axial direction of the stator, of the joint-side coil end to be made smaller than the gaps between the respective coils, which are inclined in the axial direction of the stator, of the counter-joint-side coil end. As a result, the gap between the coils can be easily filled with varnish and the varnish can be easily held therebetween, the insulating property of the coils being more improved thereby. Further, the narrow gap between the coils makes the inner layer surface of the coil ends flat, which can reduce interference noise caused by the rotation of the claw-shaped magnetic poles of the rotor and the rotation of the fans.

The axial height of the coils, which are inclined in the circumferential direction of the stator, of the joint-side coil end is smaller than the axial height of the coils, which are inclined in the circumferential direction of the stator, of the counter-joint-side coil end.

Therefore, the insulation of the joint-side coil end is improved due a large amount of varnish applied thereto, permitting the gaps between the respective coils, which are inclined in the axial direction of the stator, of the joint-side coil end to be made smaller than the gaps between the respective coils, which are inclined in the axial direction of the stator, of the counter-joint-side coil end. Thus, the bending angle of the coils can be increased with a result that the axial height of the coils can be reduced, by which the size of the generator can be reduced. Further, the narrow gap between the coils makes the inner layer surface of the coil ends flat, which can reduce interference noise caused by the rotation of the claw-shaped magnetic poles of the rotor and the rotation of the fans.

The gap in a radial direction is defined between the electric conductors at an innermost layer in a radial direction in the slots and a slot opening, and the gap is impregnated with varnish.

Therefore, the gap exists in the radial direction between the electric conductors located at the inside diameter side and the slot opening in the slot, which improves the varnish penetrating property in the gap.

The cooling fan is mounted on at least one of the ends in an axial direction of the rotor to ventilate and cool the coil ends of the stator from the inside diameter side thereof.

Therefore, the provision of the fan on at least one end in the radial direction of the rotor for ventilating and cooling the oil ends of the stator from the inside diameter thereof, improves the cooling property of the coil ends.

The rectifiers are disposed at the joint-side coil end.

Even if the rectifiers are disposed on the joint-side coil end, a drawback such as the short-circuit between the rectifiers and the joint-side coil end is not caused because the joint-side coil end has a high degree of insulation in the present invention.

The rectifiers are disposed at the counter-joint-side coil end.

Therefore, it difficult for the rectifiers to be thermally influenced because they are disposed on the counter-joint-side coil end which has a high cooling property and a low temperature.

According to the still another aspect of the invention, the method of manufacturing the stator for the automotive alternator according to the initially mentioned aspect of the invention, includes the step of supplying varnish dropwise from the outside diameter direction of the stator core and impregnating only any one of the coil ends with the varnish.

Therefore, in the stator of the construction, even if varnish is supplied dropwise from the direction of the stator core, it can be sufficiently penetrated. Further, the amounts of varnish necessary to both the coil ends can be individually controlled, permitting the amount of the varnish of one of the coil ends to be increased.

According to the further aspect of the invention, the method of manufacturing the stator for the automotive alternator according to the initially mentioned aspect of the invention, includes the step of supplying varnish dropwise from the axial direction of the stator core and impregnating only any one of the coil ends with the varnish.

Therefore, varnish is supplied dropwise to only any one of the coils ends from the axial direction of the stator core, simplifying the apparatus.

According to the still further aspect of the invention, the method of manufacturing the stator for athe automotive alternator according to the initially mentioned aspect of the invention, includes the steps of supplying dropwise varnish to only any one of the coil ends from the outside diameter direction or the axial direction of the stator core, and gelling and drying the varnish while keeping the coil end, to which the varnish is supplied dropwise, at a position higher than the position of the other coil end.

Therefore, varnish is gelled and dried in the state that the coil end, to which the varnish is supplied dropwise, is located at the position higher than the position of the other coil end, improving the penetrating property of the varnish from the coil end to which the varnish is supplied dropwise to the other coil end.

What is claimed is:

1. A staror for an automotive alternator including a rotor, which has claw-shaped magnetic poles fitted on a rotating shaft and fans, and said stator, which is disposed around the outer circumference of said rotor, has a coil wound there around and conaected into three-phase alternating-current connections, and is ventilated and cooled by said fans, wherein, said stator includes a stator core in which a plurality of slots are formed and a stator winding wound around said stator core, said stator winding being composed of a plurality of electric conductors jointed to each other, said electric conductors include a plurality of winding sub-portions in each of which one long strand of wire is bent back outside said slots at end surfaces of said staror core and wound into a wave winding so as to alternately occupy an inner layer and an outer layer in a slot depth direction within said slots a predetermined number of slots apart, and the turned portions of said strands of wire bent back outside said slots at both the end surfaces of said stator core are disposed in a circumferential direction so as to constitute a joint-side coil end and a turn-side coil end, and said winding sub-portions are connected to each other on said joint-side coil end at a first end of said stator core, wherein:

wherein the average amount of application per unit area of the varnish, with which said joint-side coil end is impregnated, is larger than the average amount of application per unit area of the varnish, with which said turn-side coil end is impregnated, wherein said turn-side coil end is impregnated with no varnish.

2. A stator for an automotive alternator including a rotor, which has claw-shaved magnetic poles fitted on a rotating shaft and fans, and said stator, which is disposed around the outer circumference of said rotor, has a coil wound there around and connected into three-phase alternating-current connections, and is ventilated and cooled by said fans, wherein, said stator includes a stator core in which a plurality of slots are formed and a stator winding wound around said stator core, said stator winding being composed of a plurality of electric conductors jointed to each other, said electric conductors include a plurality of winding sub-portions in each of which one long strand of wire is bent back outside said slots at end surfaces of said stator core and wound into a wave winding so as to alternately occupy an inner layer and an outer layer in a slot depth direction within said slots a predetermined number of slots apart, and the turned portions of said strands of wire bent back outside said slots at both the end surfaces of said stator core are disposed in the circumferential direction so as to constitute a joint-side coil end and a turn-side coil end, said plurality of winding sub-portions are connected to each other on said joint-side coil end at a first end of said stator core, wherein:

the average amount of application per unit area of any one of the varnish, with which said joint-side coil end is impregnated and the varnish, with which said turn-side coil end is impregnated, is larger than the average amount of application per unit area of the other of said varnishes, and wherein the varnish, with which said joint-side coil end is impregnated, fills the spaces between said electric conductors inclined in the circumferential direction of said stator without leaving substantially any gaps having no varnish.

3. A stator for an automotive alternator according to claim 2, wherein the average amount of application per unit area of the varnish, with which said joint-side coil end is impregnated, is larger than the average amount of application per unit area of the varnish, with which said turn-side coil end is impregnated.

4. A stator for an automotive alternator according to claim 3, wherein the amount of the varnish, with which said joint-side coil end is impregnated in said slots, is larger than the amount of the varnish, with which said turn-side coil end is impregnated in said slots.

5. A stator for an automotive alternator according to claim 3, wherein rectifiers are disposed at said joint-side coil end.

6. A stator for an automotive alternator according to claim 2, wherein the average amount of application per unit area of the varnish, with which said turn-side coil end is impregnated, is larger than the average amount of application per unit area of the varnish, with which said joint-side coil end is impregnated.

7. A stator for an automotive alternator according to claim 6, wherein the amount of the varnish, with which said turn-side coil end is impregnated in said slots, is larger than the amount of the varnish, with which said joint-side coil end is impregnated in said slots.

8. A stator for an automotive alternator according to claim 2, wherein the gap between said coils, which are inclined in the circumferential direction of said stator, of said joint-side coil end is smaller than the gap of said respective coils, which are inclined in the circumferential direction of said stator, of said turn-side coil end.

9. A stator for an automotive alternator according to claim 2, wherein the axial height of said coils, which are inclined in the circumferential direction of said stator, of said joint-side coil end is smaller than the axial height of said coils, which are inclined in the circumferential direction of said stator, of said turn-side coil end.

10. A stator for an automotive alternator according to claim 2, wherein a gap in a radial direction is defined between said electric conductors at an innermost layer in a radial direction in said slots and a slot opening, and said gap is impregnated with varnish.

11. A stator for an automotive alternator according to claim 2, wherein a cooling fan is mounted on at least one of the ends in an axial direction of said rotor to ventilate and cool said coil ends of said stator form the inside diameter side thereof.

12. A stator for an automotive alternator according to claim 2, wherein rectifiers are disposed at said turn-side coil end.

13. A method of manufacturing a stator for an automotive alternator according to claim 2, comprising supplying varnish dropwise from the outside diameter direction of said stator core and impregnating only any one of said coil ends with said varnish.

14. A method of manufacturing a stator for an automotive alternator according to claim 2, comprising supplying varnish dropwise from the axial direction of said stator core and impregnating only any one of said coil ends with said varnish.

15. A method of manufacturing a stator for an automotive alternator according to claim 2, comprising:

supplying dropwise varnish to only any one of said coil ends from the outside diameter direction or the axial direction of said stator core; and gelling and drying said varnish while keeping said coil end, to which said varnish is supplied dropwise, at a position higher than the position of the other coil end.

16. A stator for an automotive alternator including a rotor, which has claw-shaped magnetic poles fitted on a rotating shaft and fans, and said stator, which is disposed around the outer circumference of said rotor, has a coil wound there around and connected into three-phase alternating-current connections, and is ventilated and cooled by said fans, wherein, said stator includes a stator core in which a plurality of slots are formed and a stator winding wound around said stator core, said stator winding being composed of a plurality of electric conductors jointed to each other, wherein said plurality of electric conductors jointed to each other have ventilation spaces formed in a radial direction between jointed portions, and wherein said ventilation spaces have a thickness in a circumferential direction which is substantially at least as large as a thickness in a circumferential direction of each jointed portion of said plurality of electric conductors, said electric conductors include a plurality of winding sub-portions in each of which one long strand of wire is bent back outside said slots at end surfaces of said stator core and wound into a wave winding so as to alternately occupy an inner layer and an outer layer in a slot depth direction within said slots a predetermined number of slots apart, and the turned portions of said strands of wire bent back outside said slots at both the end surfaces of said stator core are disposed in the circumferential direction so as to constitute a joint-side coil end and a turn-side coil end, and said plurality of winding sub-portions are connected to each other on said joint-side coil end at a first end of said stator core, wherein:

the average amount of application per unit area of any one of the varnish, with which said joint-side coil end is impregnated and the varnish, with which said turn-side coil end is impregnated, is larger than the average amount of application per unit area of the other of said varnishes.

17. A stator for an automotive alternator including a rotor, which has claw-shaped magnetic poles fitted on a rotating shaft and fans, and said stator, which is disposed around the outer circumference of said rotor, has a coil wound there around and connected into three-phase alternating-current connections, and is ventilated and cooled by said fans, wherein, said stator includes a stator core in which a plurality of slots are formed and a stator winding wound around said stator core, said stator winding being composed of a plurality of electric conductors jointed to each other, wherein said plurality of electric conductors jointed to each other have ventilation spaces formed in a radial direction between jointed portions, and wherein said ventilation spaces have a thickness in a circumferential direction which is substantially at least as large as a thickness in a circumferential direction of each jointed portion of said plurality of electric conductors, said electric conductors are formed by being bent in a circumferential direction and jointed to each other so that conductor segments are connected to other conductor segments, which are located at different slots, at the open ends thereof, and said stator has a joint-side coil end where said plurality of conductor segments are connected at a first end of said stator core, wherein the average amount of application per unit area of the varnish, with which said turn-side coil end is impregnated, is larger than the average amount of application per unit area of the varnish, with which said joint-side coil end is impregnated.

18. A stator for an automotive alternator including a rotor, which has claw-shaped magnetic poles fitted on a rotating shaft and fans, and said stator, which is disposed around the outer circumference of said rotor, has a coil wound there around and connected into three-phase alternating-current connections, and is ventilated and cooled by said fans, wherein, said stator includes a stator core in which a plurality of slots are formed and a stator winding wound around said stator core, said stator winding being composed of a plurality of electric conductors jointed to each other, said electric conductors include a plurality of winding sub-portions in each of which one long strand of wire is bent back outside said slots at end surfaces of said stator core and wound into a wave winding so as to alternately occupy an inner layer and an outer layer in a slot depth direction within said slats a predetermined number of slots apart, and the turned portions of said strands of wire bent back outside said slots at both the end surfaces of said stator core are disposed in the circumferential direction so as to constitute a joint-side coil end and a turn-side coil end, and said plurality of winding sub-portions are connected to each other on said joint-side coil end at a first end of said stator core, wherein:

the average amount of application per unit area of any one of the varnish, with which said joint-side coil end is impregnated and the varnish, with which said turn-side coil end is impregnated, is larger than the average amount of application per unit area of the other of said varnishes, and wherein a gap between two adjacent ones of said winding sub-portions on said joint-side coil end is set to about 80% of a thickness of one of said winding sub-portions in the circumferential direction.

19. A stator for an automotive alternator including a rotor, which has claw-shaped magnetic poles fitted on a rotating shaft and fans, and said stator, which is disposed around the outer circumference of said rotor, has a coil wound there around and connected into three-phase alternating-current connections, and is ventilated and cooled by said fans, wherein, said stator includes a stator core in which a plurality of slots are formed and a stator winding wound around said stator core, said stator winding being composed of a plurality of electric conductors jointed to each other, said electric conductors are formed by being bent in a circumferential direction and jointed to each other so that conductor segments are connected to other conductor segments, which are located at different slots, at the open ends thereof, and said stator has a joint-side coil end where said plurality of conductor segments are connected at a first end of said stator core, wherein the average amount of application per unit area of the varnish, with which said turn-side coil end is impregnated, is larger than the average amount of application per unit area of the varnish, with which said joint-side coil end is impregnated, and wherein a gap between two adjacent ones of said conductor segments on said joint-side coil end is set to about 80% of a thickness of one of said conductor segment sin the circumferential direction.

* * * * *